US009181421B2

(12) United States Patent
Michie, Jr. et al.

(10) Patent No.: US 9,181,421 B2
(45) Date of Patent: *Nov. 10, 2015

(54) HIGH-DENSITY POLYETHYLENE COMPOSITIONS, METHOD OF MAKING THE SAME

(71) Applicant: Dow Global Technologies LLC, Midland, MI (US)

(72) Inventors: William J. Michie, Jr., Missouri City, TX (US); Thomas W. Kay, Scott Depot, WV (US); Stephanie M. Whited, Charleston, WV (US); Dale M. Elley-Bristow, Sarnia (CA); David T. Gillespie, Pearland, TX (US); Lonnie G. Hazlitt, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/205,678

(22) Filed: Mar. 12, 2014

(65) Prior Publication Data

US 2014/0256883 A1 Sep. 11, 2014

Related U.S. Application Data

(63) Continuation of application No. 13/867,171, filed on Apr. 22, 2013, now Pat. No. 8,697,806, which is a continuation of application No. 12/067,832, filed as application No. PCT/US2007/010735 on May 2, 2007, now Pat. No. 8,445,594.

(60) Provisional application No. 60/796,809, filed on May 2, 2006.

(51) Int. Cl.
*C08L 23/04* (2006.01)
*C08L 23/08* (2006.01)
*C08L 23/06* (2006.01)

(52) U.S. Cl.
CPC .................. *C08L 23/08* (2013.01); *C08L 23/04* (2013.01); *C08L 23/06* (2013.01); *C08L 23/0815* (2013.01); *C08L 2203/10* (2013.01); *Y10T 428/24992* (2015.01); *Y10T 428/273* (2015.01)

(58) Field of Classification Search
CPC ......... C08L 23/04; C08L 23/06; C08L 23/08; C08L 23/0815; C08L 2203/10; C08L 2666/06; Y10T 428/273; Y10T 428/24992
USPC ...................... 525/191, 240; 428/273, 249.92
See application file for complete search history.

(56) References Cited

U.S. PATENT DOCUMENTS

| | | | |
|---|---|---|---|
| 4,302,565 A | 11/1981 | Goeke et al. |
| 4,461,873 A | 7/1984 | Bailey et al. |
| 4,508,842 A | 4/1985 | Beran et al. |
| 4,530,914 A | 7/1985 | Ewen et al. |
| 4,798,081 A | 1/1989 | Hazlitt et al. |
| 4,871,705 A | 10/1989 | Hoel |
| 4,937,299 A | 6/1990 | Ewen et al. |
| 5,017,714 A | 5/1991 | Welborn, Jr. |
| 5,026,798 A | 6/1991 | Canich |
| 5,055,438 A | 10/1991 | Canich |
| 5,089,321 A | 2/1992 | Chum et al. |
| 5,096,867 A | 3/1992 | Canich |
| 5,106,926 A | 4/1992 | Eisinger et al. |
| 5,120,867 A | 6/1992 | Welborn, Jr. |
| 5,124,418 A | 6/1992 | Welborn, Jr. |
| 5,145,819 A | 9/1992 | Winter et al. |
| 5,198,401 A | 3/1993 | Turner et al. |
| 5,210,352 A | 5/1993 | Alt et al. |
| 5,229,478 A | 7/1993 | Floyd et al. |
| 5,243,001 A | 9/1993 | Winter et al. |
| 5,264,405 A | 11/1993 | Canich |
| 5,272,236 A | 12/1993 | Lai et al. |
| 5,278,119 A | 1/1994 | Turner et al. |
| 5,278,264 A | 1/1994 | Spaleck et al. |
| 5,278,272 A | 1/1994 | Lai et al. |
| 5,290,745 A | 3/1994 | Jorgensen et al. |
| 5,292,845 A | 3/1994 | Kawasaki et al. |
| 5,304,614 A | 4/1994 | Winter et al. |
| 5,317,036 A | 5/1994 | Brady, III et al. |
| 5,324,800 A | 6/1994 | Welborn, Jr. et al. |
| 5,332,793 A | 7/1994 | Cann |
| 5,342,907 A | 8/1994 | Cann et al. |
| 5,347,025 A | 9/1994 | Yamada et al. |
| 5,350,723 A | 9/1994 | Neithamer et al. |
| 5,384,299 A | 1/1995 | Turner et al. |
| 5,391,789 A | 2/1995 | Rohrmann |
| 5,391,790 A | 2/1995 | Rohrmann et al. |
| 5,399,636 A | 3/1995 | Alt et al. |
| 5,408,017 A | 4/1995 | Turner et al. |
| 5,410,003 A | 4/1995 | Bai |

(Continued)

*Primary Examiner* — Nathan M Nutter

(57) ABSTRACT

The instant invention is a high-density polyethylene composition, method of producing the same, articles made therefrom, and method of making such articles. The high-density polyethylene composition of the instant invention includes a first component, and a second component. The first component is a high molecular weight ethylene alpha-olefin copolymer having a density in the range of 0.915 to 0.940 g/cm³, and a melt index ($I_{21.6}$) in the range of 0.5 to 10 g/10 minutes. The second component is a low molecular weight ethylene polymer having a density in the range of 0.965 to 0.980 g/cm³, and a melt index ($I_2$) in the range of 50 to 1500 g/10 minutes. The high-density polyethylene composition has a melt index ($I_2$) of at least 1, a density in the range of 0.950 to 0.960 g/cm³, and g' of 1.

18 Claims, 4 Drawing Sheets

(56) References Cited

U.S. PATENT DOCUMENTS

| | | | |
|---|---|---|---|
| 5,455,366 | A | 10/1995 | Rohrmann et al. |
| 5,461,127 | A | 10/1995 | Naganuma et al. |
| 5,491,207 | A | 2/1996 | Hoel |
| 5,527,752 | A | 6/1996 | Reichle et al. |
| 5,534,473 | A | 7/1996 | Welch et al. |
| 5,539,124 | A | 7/1996 | Etherton et al. |
| 5,554,775 | A | 9/1996 | Krishnamurti et al. |
| 5,621,126 | A | 4/1997 | Canich et al. |
| 5,684,098 | A | 11/1997 | Wang et al. |
| 5,693,730 | A | 12/1997 | Kuber et al. |
| 5,698,634 | A | 12/1997 | Yasuda et al. |
| 5,710,297 | A | 1/1998 | Weller et al. |
| 5,712,354 | A | 1/1998 | Boncella et al. |
| 5,714,427 | A | 2/1998 | Winter et al. |
| 5,714,555 | A | 2/1998 | Chabrand et al. |
| 5,718,974 | A | 2/1998 | Kmiec |
| 5,721,185 | A | 2/1998 | LaPointe et al. |
| 5,728,641 | A | 3/1998 | Aida et al. |
| 5,728,839 | A | 3/1998 | Herrmann et al. |
| 5,753,577 | A | 5/1998 | Hamura et al. |
| 5,767,209 | A | 6/1998 | McNally et al. |
| 5,770,664 | A | 6/1998 | Okumura et al. |
| 5,770,753 | A | 6/1998 | Kuber et al. |
| 5,852,143 | A | 12/1998 | Sishta et al. |
| 5,939,503 | A | 8/1999 | Goddard, III et al. |
| 6,152,543 | A | 11/2000 | Schlund et al. |
| 6,172,169 | B1 | 1/2001 | Starzewski et al. |
| 6,180,721 | B1 | 1/2001 | Rogestedt et al. |
| 6,187,866 | B1 | 2/2001 | Jorgensen et al. |
| 6,248,831 | B1 | 6/2001 | Maheshwari et al. |
| 6,344,522 | B1 | 2/2002 | Promel |
| 6,485,662 | B1 | 11/2002 | Neubauer et al. |
| 6,511,935 | B2 | 1/2003 | Job |
| 6,617,405 | B1 | 9/2003 | Jorgensen |
| 6,787,608 | B2 | 9/2004 | VanDun et al. |
| 6,908,968 | B2 | 6/2005 | Jain et al. |
| 7,205,364 | B1 | 4/2007 | Canich |
| 7,396,881 | B2 | 7/2008 | Lustiger et al. |
| 7,714,072 | B2 | 5/2010 | Michie, Jr. et al. |
| 7,750,082 | B2 | 7/2010 | De Cambry De Baudimont et al. |
| 7,750,083 | B2 | 7/2010 | De Cambry De Baudimont et al. |
| 8,044,160 | B2 | 10/2011 | Nord-Varhaug et al. |
| 8,129,472 | B2 | 3/2012 | Turner et al. |
| 8,445,594 | B2 | 5/2013 | Michie, Jr. et al. |
| 8,697,806 | B2 * | 4/2014 | Michie et al. .......... 525/191 |
| 2006/0287445 | A1 | 12/2006 | Whited et al. |
| 2007/0034652 | A1 | 2/2007 | Petit |
| 2007/0043177 | A1 | 2/2007 | Michie et al. |
| 2008/0069990 | A1 | 3/2008 | Augestad et al. |
| 2009/0062463 | A1 | 3/2009 | Backmann et al. |
| 2009/0068429 | A1 | 3/2009 | Kmiec et al. |
| 2009/0198018 | A1 | 8/2009 | Baeckman et al. |
| 2009/0203848 | A1 | 8/2009 | Gustafsson et al. |
| 2009/0252910 | A1 | 10/2009 | Baeckman et al. |
| 2009/0253863 | A1 | 10/2009 | Nord-Varhaug et al. |
| 2010/0084363 | A1 | 4/2010 | Michie, Jr. et al. |

* cited by examiner

HIGH-DENSITY POLYETHYLENE COMPOSITIONS, METHOD OF MAKING THE SAME

CROSS-REFERENCE TO RELATED APPLICATIONS

The present application is a continuation application of U.S. application Ser. No. 13/867,171, filed on Apr. 22, 2013, now allowed, which is a continuation of U.S. application Ser. No. 12/067,832, filed on Mar. 24, 2008, and now, U.S. Pat. No. 8,445,594, which is a section 371 of PCT/US07/10735, filed on May 2, 2007, which claims priority from U.S. Application No. 60/796,809, filed May 2, 2006; each application is incorporated herein, in its entirety, by reference.

FIELD OF INVENTION

The instant invention relates to high-density polyethylene compositions, method of making the same, and articles made therefrom.

BACKGROUND OF THE INVENTION

The use of polymeric materials to manufacture molded articles, such as closure devices and containers, is generally known. Different methods may be employed to manufacture closure devices, such as bottle caps, or containers, such as bottles. For example, such closure devices may be manufactured via compression molding or injection molding processes; or in the alternative, containers may be manufactured via blow molding, injection blow molding, or injection stretch blow molding.

In compression molding process, a two-piece mold provides a cavity having the shape of a desired molded article. The mold is heated. An appropriate amount of molten molding compound from an extruder is loaded into the lower half of the mold. The two parts of the mold are brought together under pressure. The molding compound, softened by heat, is thereby welded into a continuous mass having the shape of the cavity. If the molding compound is a thermosetting material, the continuous mass may be hardened via further heating, under pressure, in the mold. If the molding compound is a thermoplastic material, the continuous mass may be hardened via chilling, under pressure, in the mold.

In injection molding process, molding compound is fed into an extruder via a hopper. The extruder conveys, heats, melts, and pressurizes the molding compound to a form a molten stream. The molten stream is forced out of the extruder through a nozzle into a relatively cool mold held closed under pressure thereby filing the mold. The melt cools and hardens until fully set-up. The mold then opens and the molded part is removed.

In blow molding process, for example injection blow molding, the molding compound is melted, and then, it is formed into a tube or parison. The ends of the tube or parison is sealed, except for an area in which the blowing air can enter. The sealed tube or parison is inflated inside of a mold thereby taking the shape of the mold. The molded article is cooled, and then ejected from the mold. If necessary, the molded article is then trimmed.

In general, a closure device, such as a soda bottle cap, should be strong enough to withstand the pressure of a carbonated drink, and yet soft enough to provide an excellent seal on the bottle without the need for an inner liner. Additionally, a closure device, such as a soda bottle cap, should generally possess good environmental stress crack resistance, good impact strength, good removal torque, and good strip torque. Different techniques have been employed to provide for such closure devices having acceptable properties.

For example, the use of a polypropylene polymer as a bottle cap closure for the needed strength with an inner liner, which may be comprised of soft ethylene/vinyl acetate (EVA), polyvinyl chloride (PVC), butyl rubber, etc., is also generally well known. However, this two-part construction is costly because of the need for an inner liner. Furthermore, it would be easier and more convenient to use a one-piece closure, without a liner.

In attempts to eliminate the need for a two-part construction, the use of different blends of polymers has been suggested. However, there is still a need for polymer formulations that can be molded into closure devices having acceptable properties, such as no need for liners to facilitate a seal, acceptable taste and odor, satisfactory stress crack resistance, and impact strength to prevent cap failure.

SUMMARY OF THE INVENTION

The instant invention is a high-density polyethylene composition, method of producing the same, articles made therefrom, and method of making such articles. The high-density polyethylene composition of the instant invention includes a first component, and a second component. The first component is a high molecular weight ethylene alpha-olefin copolymer having a density in the range of 0.915 to 0.940 g/cm$^3$, and a melt index ($I_{21.6}$) in the range of 0.5 to 10 g/10 minutes. The second component is a low molecular weight ethylene polymer having a density in the range of 0.965 to 0.980 g/cm$^3$, and a melt index ($I_2$) in the range of 50 to 1500 g/10 minutes. The high-density polyethylene composition has a melt index ($I_2$) of at least 1, a density in the range of 0.950 to 0.960 g/cm$^3$, and g' of equal or greater than 1. The method of producing a high-density polyethylene composition includes the following steps: (1) introducing ethylene, and one or more alpha-olefin comonomers into a first reactor; (2) (co)polymerizing the ethylene in the presence of one or more alpha-olefin comonomers in the first reactor thereby producing a first component, wherein the first component being a high molecular weight ethylene alpha-olefin copolymer having a density in the range of 0.915 to 0.940 g/cm$^3$, and a melt index ($I_{21.6}$) in the range of 0.5 to 10 g/10 minutes; (3) introducing the first component and additional ethylene into a second reactor; (4) polymerizing the additional ethylene in the second reactor thereby producing a second component, wherein the second component being a low molecular weight ethylene polymer having a density in the range of 0.965 to 0.980 g/cm$^3$, and a melt index ($I_2$) in the range of 50 to 1500 g/10 minutes; and (5) thereby producing the high-density polyethylene composition, wherein the high-density polyethylene composition having a melt index ($I_2$) of at least 1, a density in the range of 0.950 to 0.960 g/cm$^3$, and g' of equal or greater than 1. The articles according to instant invention comprise the above-described inventive high-density polyethylene composition, and such articles may be made via compression molding, injection molding, injection blow molding, or injection stretch blow molding.

In one embodiment, the instant invention provides a high-density polyethylene composition comprising a high molecular weight polyethylene alpha-olefin copolymer having a density in the range of 0.915 to 0.940 g/cm$^3$, and a melt index ($I_{21.6}$) in the range of 0.5 to 10 g/10 minutes, and a low molecular weight ethylene polymer having a density in the range of 0.965 to 0.980 g/cm$^3$, and a melt index ($I_2$) in the range of 50 to 1500 g/10 minutes, wherein the inventive high-density polyethylene composition having a melt index ($I_2$) of at least 1 g/10 minutes, a density in the range of 0.950 to 0.960 g/cm³, and g' of equal or greater than 1.

In an alternative embodiment, the instant invention further provides a method for producing a high-density polyethylene composition comprising the steps of: (1) introducing ethylene, and one or more alpha-olefin comonomers into a first reactor; (2) (co)polymerizing the ethylene in the presence of one or more alpha-olefin comonomers in the first reactor thereby producing a high molecular weight ethylene alpha-olefin copolymer having a density in the range of 0.915 to 0.940 g/cm³, and a melt index ($I_{21}$) in the range of 0.5 to 10 g/10 minutes; (3) introducing the high molecular weight ethylene alpha-olefin copolymer and additional ethylene into a second reactor; (4) polymerizing the additional ethylene in the second reactor thereby producing a low molecular weight ethylene polymer having a density in the range of 0.965 to 0.980 g/cm³, and a melt index ($I_2$) in the range of 50 to 1500 g/10 minutes; and (5) thereby producing the high-density polyethylene composition, wherein the high-density polyethylene composition having a melt index ($I_2$) of at least 1, a density in the range of 0.950 to 0.960 g/cm³, and g' of equal or greater than 1.

In another alternative embodiment, the instant invention provides an article comprising a high-density polyethylene composition, wherein the high-density polyethylene composition comprising a high molecular weight polyethylene alpha-olefin copolymer having a density in the range of 0.915 to 0.940 g/cm³, and a melt index ($I_{21.6}$) in the range of 0.5 to 10 g/10 minutes, and a low molecular weight ethylene polymer having a density in the range of 0.965 to 0.980 g/cm³, and a melt index ($I_2$) in the range of 50 to 1500 g/10 minutes, wherein the inventive high-density polyethylene composition having a melt index ($I_2$) of at least 1 g/10 minutes, a density in the range of 0.950 to 0.960 g/cm³, and g' of equal or greater than 1.

In another alternative embodiment, the instant invention provides a method of making an article comprising the steps of: (1) providing a high-density polyethylene composition comprising a high molecular weight ethylene alpha-olefin copolymer having a density in the range of 0.915 to 0.940 g/cm³, and a melt index ($I_{21.6}$) in the range of 0.5 to 10 g/10 minutes; and a low molecular weight ethylene polymer having a density in the range of 0.965 to 0.980 g/cm³, and a melt index ($I_2$) in the range of 50 to 1500 g/10 minutes; wherein the high-density polyethylene composition having a melt index ($I_2$) of at least 1 g/10 minutes, a density in the range of 0.950 to 0.960 g/cm³, and g' of equal or greater than 1; (2) compression molding, injection molding, injection blow molding, or injection stretch blow molding the high-density polyethylene composition (3) thereby forming the article.

In an alternative embodiment, the instant invention provides a method for producing a high-density polyethylene composition, in accordance with any of the preceding embodiments except that the second reactor being substantially free of any other alpha-olefin copolymers.

In an alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a density in the range of 0.920 to 0.940 g/cm³.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a density in the range of 0.921 to 0.936 g/cm³.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a melt index ($I_{21.6}$) in the range of 1 to 7 g/10 minutes.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a melt index ($I_{21.6}$) in the range of 1.3 to 5 g/10 minutes.

In another alternative embodiment, the instant invention provides a high-density polyethylene composition, method of producing the same, articles made therefrom, and method of making such articles, in accordance with any of the preceding embodiments, except that the low molecular weight ethylene polymer having a density in the range of 0.970 to 0.975 g/cm³.

In another alternative embodiment, the instant invention provides a high-density polyethylene composition, method of producing the same, articles made therefrom, and method of making such articles, in accordance with any of the preceding embodiments, except that the low molecular weight ethylene polymer having a melt index ($I_2$) in the range of 100 to 1500 g/10 minutes.

In another alternative embodiment, the instant invention provides a high-density polyethylene composition, method of producing the same, articles made therefrom, and method of making such articles, in accordance with any of the preceding embodiments, except that the low molecular weight ethylene polymer having a melt index ($I_2$) in the range of 200 to 1500 g/10 minutes.

In another alternative embodiment, the instant invention provides a high-density polyethylene composition, method of producing the same, articles made therefrom, and method of making such articles, in accordance with any of the preceding embodiments, except that the high-density polyethylene composition having a melt index ($I_2$) in the range of 1 to 2 g/10 minutes; or in the alternative, having a melt index ($I_2$) of at least 2 g/10 minutes.

In another alternative embodiment, the instant invention provides a high-density polyethylene composition, method of producing the same, articles made therefrom, and method of making such articles, in accordance with any of the preceding embodiments, except that the high molecular weight ethylene alpha-olefin copolymer having a molecular weight in the range of 150,000 to 375,000.

In another alternative embodiment, the instant invention provides a high-density polyethylene composition, method of producing the same, articles made therefrom, and method of making such articles, in accordance with any of the preceding embodiments, except that the low molecular weight ethylene polymer having a molecular weight in the range of 12,000 to 40,000.

In another alternative embodiment, the instant invention provides a high-density polyethylene composition, method of producing the same, articles made therefrom, and method of making such articles, in accordance with any of the preceding embodiments, except that the high molecular weight polyethylene alpha-olefin copolymer having a density in the range of 0.921 to 0.936 g/cm³, and a melt index ($I_{21.6}$) in the range of 1.3 to 5 g/10 minutes, and the low molecular weight ethylene polymer having a density in the range of 0.970 to 0.975 g/cm³, and a melt index ($I_2$) in the range of 200 to 1500 g/10 minutes.

In another alternative embodiment, the instant invention provides a high-density polyethylene composition, method of producing the same, articles made therefrom, and method of making such articles, in accordance with any of the preceding embodiments, except that both the high molecular weight polyethylene alpha-olefin copolymer and the low molecular weight ethylene polymer being substantially free of any long chain branching.

In another alternative embodiment, the instant invention provides a high-density polyethylene composition, method of producing the same, articles made therefrom, and method of making such articles, in accordance with any of the preceding embodiments, except that the high-density polyethylene composition being substantially free of any long chain branching.

In another alternative embodiment, the instant invention provides a high-density polyethylene composition, method of producing the same, articles made therefrom, and method of making such articles, in accordance with any of the preceding embodiments, except that the high-density polyethylene composition having a single ATREF temperature peak, wherein the ATREF temperature peak having a temperature peak maximum between 90° C. to 105° C.; and wherein the high-density polyethylene composition having a calculated high density fraction in the range of 20 percent to 50 percent, said calculated high density fraction being defined as [(2)×(the weight ratio of the high-density polyethylene that elutes in ATREF-DV at temperatures greater than or equal to the temperature peak maximum)]; and wherein the high-density polyethylene composition having a relative minimum in the log of the relative viscosity average molecular weight at about 90° C. in ATRF-DV; and wherein the high-density polyethylene composition having a regression slop of the log of the relative viscosity average molecular weight versus the ATREF-DV viscosity v. temperature plot of less than about 0, where the elution temperature measured between 70° C. to 90° C.

In another alternative embodiment, the instant invention provides a high-density polyethylene composition, method of producing the same, articles made therefrom, and method of making such articles, in accordance with any of the preceding embodiments, except that the high-density polyethylene composition having a comonomer content in weight percent equal or greater that [(−228.41*density of high-density polyethylene composition)+219.36)]*[1(weight percent)/(g/cm³)], where density is measured in g/cm³.

In another alternative embodiment, the instant invention provides a high-density polyethylene composition, method of producing the same, articles made therefrom, and method of making such articles, in accordance with any of the preceding embodiments, except that the high-density polyethylene composition having an ATREF high-density fraction in percent of equal or less than [(2750*density of the high-density polyethylene composition)−2552.2]*[1(percent)/(g/cm³)], where density is measured in g/cm³.

In another alternative embodiment, the instant invention provides an article and a method of making an article, in accordance with any of the preceding embodiments, except that the article having an environmental stress crack resistance of at least 150 hours measured via ASTM D-1693 condition B, 10 percent Igepal, or at least 300 hours measured via ASTM D-1693 condition B, 100 percent Igepal.

In another alternative embodiment, the instant invention provides an article and a method of making an article, in accordance with any of the preceding embodiments, except that the article being a closure device, a wire cable jacketing, a conduit pipe, or a bottle.

In another alternative embodiment, the instant invention provides an article and a method of making an article, in accordance with any of the preceding embodiments, except that the article being a compression molded article, injection molded article, an injection blow molded article, or an injection stretch blow molded article.

In another alternative embodiment, the instant invention provides a compression molded or injection molded article and a method of making a compression molded or injection molded article, in accordance with any of the preceding embodiments, except that the article being a bottle cap.

In another alternative embodiment, the instant invention provides a compression molded or injection molded article and a method of making a compression molded or injection molded article, in accordance with any of the preceding embodiments, except that the article being a cap including a skirt that axially extends from the periphery of a base, and having internal threads for securing the cap to a container.

In an alternative embodiment, the instant invention provides a compression molded article and a method of making a compression molded article, in accordance with any of the preceding embodiments, except that the article being a compression molded cap including a skirt that axially extends from the periphery of a base, and having internal threads for securing the cap to a container.

In another alternative embodiment, the instant invention provides an injection molded article and a method of making an injection molded article, in accordance with any of the preceding embodiments, except that the article being an injection molded cap including a skirt that axially extends from the periphery of a base, and having internal threads for securing the cap to a container.

In another alternative embodiment, the instant invention provides a blow molded article and a method of making a blow molded article, in accordance with any of the preceding embodiments, except that the article being an injection blow molded bottle.

BRIEF DESCRIPTION OF THE DRAWINGS

For the purpose of illustrating the instant invention, there is shown in the drawings a form that is presently preferred; it being understood, however, that this invention is not limited to the precise arrangements and instrumentalities shown.

DETAILED DESCRIPTION OF THE INVENTION

Figure 1:
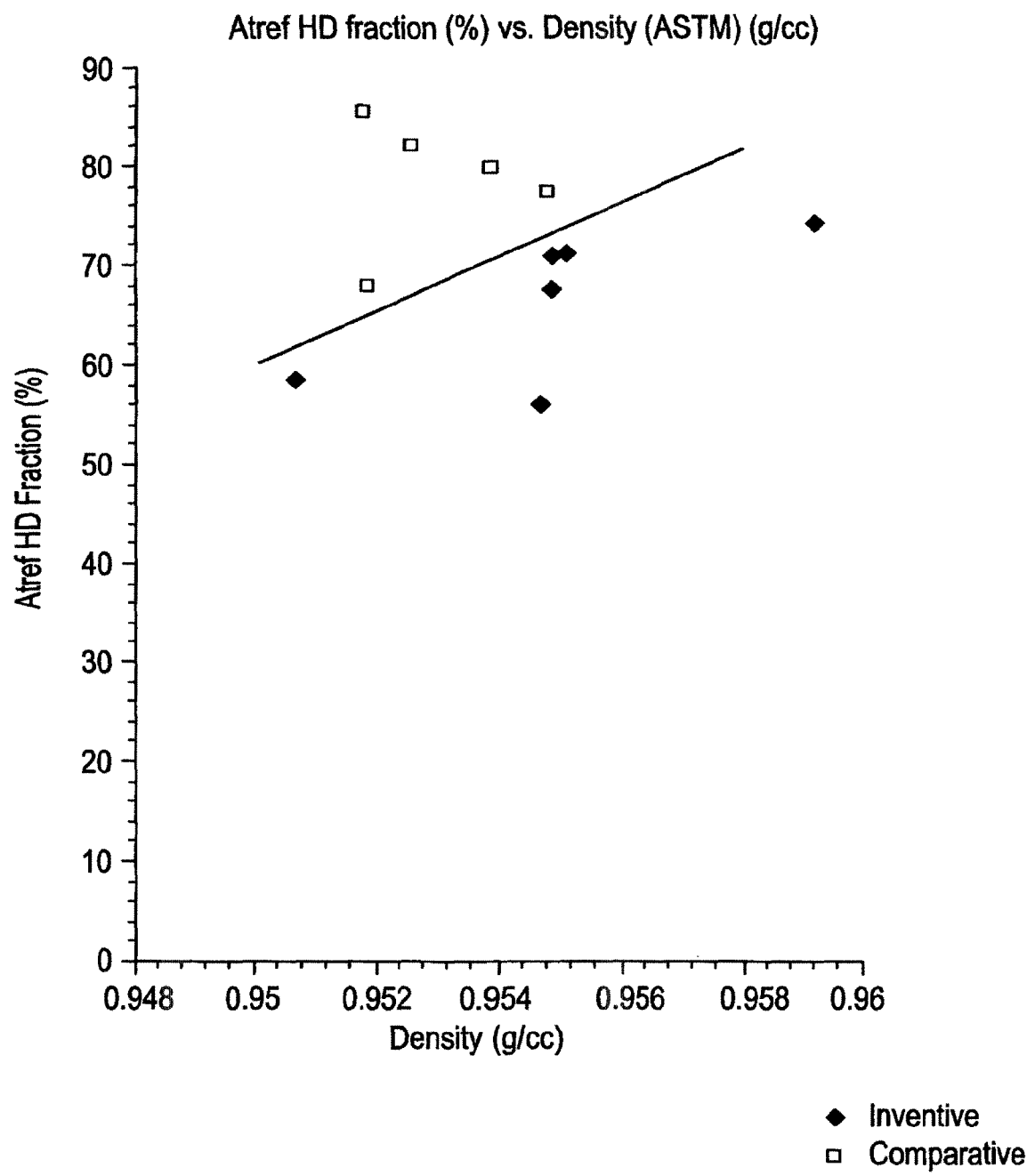
FIG. 1 is a graph illustrating the relationship between the comonomer content and the density of the high-density polyethylene composition of the instant invention.

The high-density polyethylene composition of the instant invention includes a first component, and a second component. The first component is preferably a high molecular weight ethylene alpha-olefin copolymer having a density in the range of 0.915 to 0.940 g/cm³, and a melt index ($I_{21}$) of 0.5 to 10 g/10 minutes. The second component is preferably a low molecular weight ethylene polymer having a density in the range of 0.965 to 0.980 g/cm³, and a melt index ($I_2$) in the range of 50 to 1500 g/10 minutes. The high-density polyethylene composition has a melt index ($I_2$) of at least 1 g/10 minutes, a density in the range of 0.950 to 0.960 g/cm³, and g' of equal or greater than 1. The high-density polyethylene composition may further include additional components, additives, or adjuvants. The high-density polyethylene composition is a bimodal polymer, or in the alternative, the high-density polyethylene is a multimodal polymer.

The term "bimodal," as used herein, means that the molecular weight distribution (MWD) in a Gel Permeation Chromatography (GPC) curve exhibits two component polymers, for example, two peaks or wherein one component polymer may even exist as a hump, shoulder, or tail relative to the MWD of the other component polymer; or in the alternative, for example, wherein the two components may have only one single peak with no bumps, shoulders, or tails.

The term "multimodal" as used herein means that the MWD in a GPC curve exhibits more than two component polymers, for example, three or more peaks or wherein one component polymer may even exist as a hump, shoulder, or tail, relative to the MWD of the other component polymers; or in the alternative, wherein three or more components may have only one single pick with no bumps, shoulders, or tails.

The term "polymer" is used herein to indicate a homopolymer, an interpolymer (or copolymer), or a terpolymer. The term "polymer," as used herein, includes interpolymers, such as, for example, those made by the copolymerization of ethylene with one or more $C_3$-$C_{20}$ alpha-olefin(s).

The term "interpolymer," as used herein, refers to polymers prepared by the polymerization of at least two different types of monomers. The generic term interpolymer thus includes copolymers, usually employed to refer to polymers prepared from two different types of monomers, and polymers prepared from more than two different types of monomers.

The term (co)polymerization, as used herein, refers to polymerization of ethylene in the presence of one or more alpha-olefin comonomers.

The first component is a polymer; for example, a polyolefin. The first component is preferably be an ethylene polymer; for example, first component is preferably a high molecular weight ethylene alpha-olefin copolymer. The first component is substantially free of any long chain branching. Substantially free of any long chain branching, as used herein, refers to an ethylene polymer preferably substituted with less than about 0.1 long chain branching per 1000 total carbons, and more preferably, less than about 0.01 long chain branching per 1000 total carbons. The presence of long chain branches is typically determined according to the methods known in the art, such as gel permeation chromatography coupled with low angle laser light scattering detector (GPC-LALLS) and gel permeation chromatography coupled with a differential viscometer detector (GPC-DV). The first component has a density; in the range of 0.915 to 0.940 g/cm³. All individual values and subranges from 0.915 to 0.940 g/cm³ are included herein and disclosed herein; for example, the first component has a density in the range of 0.920 to 0.940 g/cm³, or in the alternative, the first component has a density in the range of 0.921 to 0.936 g/cm³. The first component has a melt index ($I_{21.6}$); in the range of 0.5 to 10 g/10 minutes. All individual values and subranges from 0.5 to 10 g/10 minutes are included herein and disclosed herein; for example, the first component has a melt index ($I_{21.6}$) in the range of 1 to 7 g/10 minutes, or in the alternative, the first component has a melt index ($I_{21.6}$) in the range of 1.3 to 5 g/10 minutes. The first component has molecular weight in the range of 150,000 to 375,000. All individual values and subranges from 150,000 to 375,000 are included herein and disclosed herein; for example, the first component has a molecular weight in the range of 175,000 to 375,000; or in the alternative, the first component has a molecular weight in the range of 200,000 to 375,000. The first component may comprise any amount of one or more alpha-olefin copolymers; for example, the first component comprises about less than 10 percent by weight of one or more alpha-olefin comonomers, based on the weight of the first component. All individual values and subranges less than 10 weight percent are included herein and disclosed herein. The first component may comprise any amount of ethylene; for example, the first component comprises at least about 90 percent by weight of ethylene, based on the weight of the first component. All individual values and subranges above 90 weight percent are included herein and disclosed herein; for example, the first component comprises at least 95 percent by weight of ethylene, based on the weight of the first component.

The alpha-olefin comonomers typically have no more than 20 carbon atoms. For example, the alpha-olefin comonomers may preferably have 3 to 10 carbon atoms, and more preferably 3 to 8 carbon atoms. Exemplary alpha-olefin comonomers include, but are not limited to, propylene, 1-butene, 1-pentene, 1-hexene, 1-heptene, 1-octene, 1-nonene, 1-decene, and 4-methyl-1-pentene. The alpha-olefin comonomers are preferably selected from the group consisting of propylene, 1-butene, 1-hexene, and 1-octene, and more preferably from the group consisting of 1-hexene and 1-octene.

The second component is a polymer; for example, a polyolefin. The second component is preferably an ethylene polymer; for example, second component is preferably a low molecular weight ethylene homopolymer. The ethylene homopolymer may contain trace amounts of contaminate comonomers, for example alpha-olefin comonomers. The term ethylene homopolymer, as used herein, refers to an ethylene polymer containing at least 99 percent by weight of ethylene units. The second component is preferably substantially free of any long chain branching. Substantially free of any long chain branching, as used herein, refers to an ethylene polymer preferably substituted with less than about 0.1 long chain branching per 1000 total carbons, and more preferably, less than about 0.01 long chain branching per 1000 total carbons. The presence of long chain branches is typically determined according to the methods known in the art, as mentioned above. The second component has a density; in the range of 0.965 to 0.980 g/cm³. All individual values and subranges from 0.965 to 0.980 g/cm³ are included herein and disclosed herein; for example, the second component has a density in the range of 0.970 to 0.975 g/cm³. The second component has a melt index ($I_2$) in the range of 50 to 1500 g/10 minutes. All individual values and subranges from 50 to 1500 g/10 minutes are included herein and disclosed herein; for example, the second component has a melt index ($I_2$) in the range of 200 to 1500 g/10 minutes; or in the alternative, the second component has a melt index ($I_2$) in the range of 500 to 1500 g/10 minutes. The second component has a molecular weight in the range of 12,000 to 40,000. All individual values and subranges from 12,000 to 40,000 are included herein and disclosed herein; for example, the second component has a molecular weight in the range of 15,000 to 40,000; or in the alternative, the second component has a molecular weight in the range of 20,000 to 40,000. The second component comprises less than 1.00 percent by weight of one or more alpha-olefin copolymers, based on the weight of the second component. All individual values and subranges from less than 1.00 weight percent are included herein and disclosed herein; for example, the second component may comprise 0.0001 to 1.00 percent by weight of one or more alpha-olefin copolymers; the second component may comprise 0.001 to 1.00 percent by weight of one or more alpha-olefin copolymers. The second component comprises at least about 99 percent by weight of ethylene, based on the weight of the second component. All individual values and subranges from 99 to 100 weight percent are included herein and disclosed herein; for example, the second component comprises 99.5 to 100 percent by weight of ethylene, based on the weight of the second component.

The high-density polyethylene composition has a density in the range of 0.950 to 0.960 g/cm$^3$. All individual values and subranges from 0.950 to 0.960 g/cm$^3$ are included herein and disclosed herein. The high-density polyethylene composition has a melt index ($I_2$) of at least 1 g/10 minutes. All individual values and subranges equal or greater than 1 g/10 minutes are included herein and disclosed herein; for example, the high-density polyethylene composition has a melt index ($I_2$) in the range of 1 to 2 g/10 minutes; or in the alternative, the high-density polyethylene composition has a melt index ($I_2$) of at least 2 g/10 minutes. The high-density polyethylene composition is substantially free of any long chain branching. Substantially free of any long chain branching, as used herein, refers to a polyethylene composition preferably substituted with less than about 0.1 long chain branching per 1000 total carbons, and more preferably, less than about 0.01 long chain branching per 1000 total carbons. The presence of long chain branches is typically determined according to the methods known in the art, as mentioned above. The high-density polyethylene composition has a molecular weight distribution in the range of 6 to 25. All individual values and subranges from 6 to 25 are included herein and disclosed herein; for example, the high-density polyethylene composition has a molecular weight distribution in the range of 7 to 20; or in the alternative, the high-density polyethylene composition has a molecular weight distribution in the range of 7 to 17. The term molecular weight distribution or "MWD," as used herein, refers to the ratio of weight average molecular weight ($M_w$) to number average molecular weight ($M_n$), that is ($M_w/M_n$), described in further details hereinbelow. The high-density polyethylene composition has an environmental stress crack resistance of at least 150 hours measured via ASTM D-1693, Condition B, 10 percent Igepal, or preferably at least 200 hours measured via ASTM D-1693, Condition B, 10 percent Igepal, or more preferably, at least 250 hours measured via ASTM D-1693, Condition B, 10 percent Igepal. In the alternative, the high-density polyethylene composition has an environmental stress crack resistance of at least 300 hours measured via ASTM D-1693, Condition B, 100 percent Igepal, or preferably, at least 400 hours measured via ASTM D-1693, Condition B, 100 percent Igepal, or more preferably, at least 500 hours measured via ASTM D-1693, Condition B, 100 percent Igepal. The high-density polyethylene composition may comprise any amounts of first component, second component, or combinations thereof. The high-density polyethylene composition comprises 40 to 60 percent by weight of the first component, based on the total weight of the first and second components. All individual values and subranges from 40 to 60 weight percent are included herein and disclosed herein; for example, the high-density polyethylene composition comprises 42 to 55 percent by weight of the first component, based on the total weight of first and second components. The high-density polyethylene composition further comprises 40 to 60 percent by weight of the second component, based on the total weight of the first and second components. All individual values and subranges from 40 to 60 weight percent are included herein and disclosed herein; for example, the high-density polyethylene composition further comprises 48 to 55 percent by weight of the second component, based on the total weight of the first and second components. Preferably, the high-density polyethylene composition has a single ATREF temperature peak, wherein the ATREF temperature peak having a temperature peak maximum between 90° C. to 105° C., as described hereinbelow in further details. The high-density polyethylene composition further has a calculated high-density fraction in the range of 20 percent to 50 percent. All individual values and subranges from 20 percent to 50 percent are included herein and disclosed herein. The calculated high-density fraction, as used herein, refers to [(2)×(the weight ratio of the high-density polyethylene that elutes in ATREF-DV at temperatures greater than or equal to the temperature peak maximum]. Additionally, the high-density polyethylene composition has a relative minimum in the log of the relative viscosity average molecular weight at about 90° C. in ATREF-DV, and a regression slope of the log of the relative viscosity average molecular weight versus the ATREF-DV viscosity versus temperature plot of less than about 0, where the elution temperature is measured between 70° C. to 90° C.

The ATREF high-density fraction (percent) of the polyethylene composition is calculated by integrating the area under the curve from 86° C. and higher as long as there is no relative minimum in the curve. None of the inventive or comparative samples measured and reported in the tables had a relative minimum in the curve from 86° C. and higher temperatures.

The high-density polyethylene composition has a g' average of equal or greater than 1 measured by triple detector gel permeation chromatography (GPC), described in further details herein below. g' is expressed as the ratio of intrinsic viscosity of the instant high-density polyethylene composition to the intrinsic viscosity of a linear polymer reference. If the g' is equal or greater than 1 then the sample being analyzed is considered linear, and if g' is less than 1, it is, then, by definition a branched polymer as compared to a linear polymer. However, current testing methods may be subject to errors in their precision and accuracy; thus, proper steps must be taken into account for such precision errors. Therefore, small deviations, for example values of less than or equal to 0.012, from unity, that is 0.988 to 1.012, would still be defined as linear polymers. In the alternative, small deviation, for example values of less than or equal to 0.025, from unity, that is 0.975 to 1.025, would still be defined as linear polymers.

Referring to FIG. 1, the high-density polyethylene composition has an ATREF high-density fraction in percent of equal or less than [(2750*density of the high-density polyethylene composition)−2552.2]*[1(percent)/(g/cm$^3$)], where density is measured in g/cm$^3$.

Figure 2:
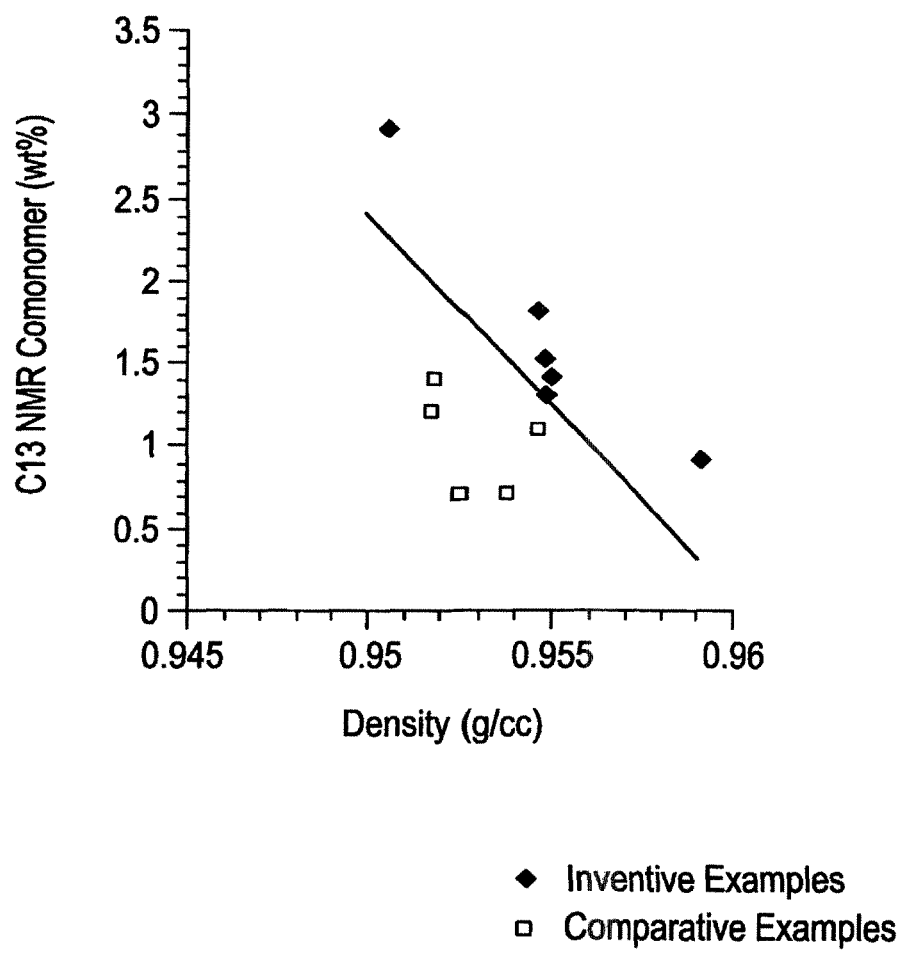
FIG. 2 is a graph illustrating the relationship between high density fraction measured via analytical temperature raising elution fractionation analysis (ATREF) and density of the inventive high-density polyethylene composition.

Referring to FIG. 2, the high-density polyethylene composition has a comonomer content in weight percent equal or greater that [(−228.41*density of high-density polyethylene composition)+219.36)]*[1(weight percent)/(g/cm$^3$)], where density is measured in g/cm$^3$.

Figure 3:
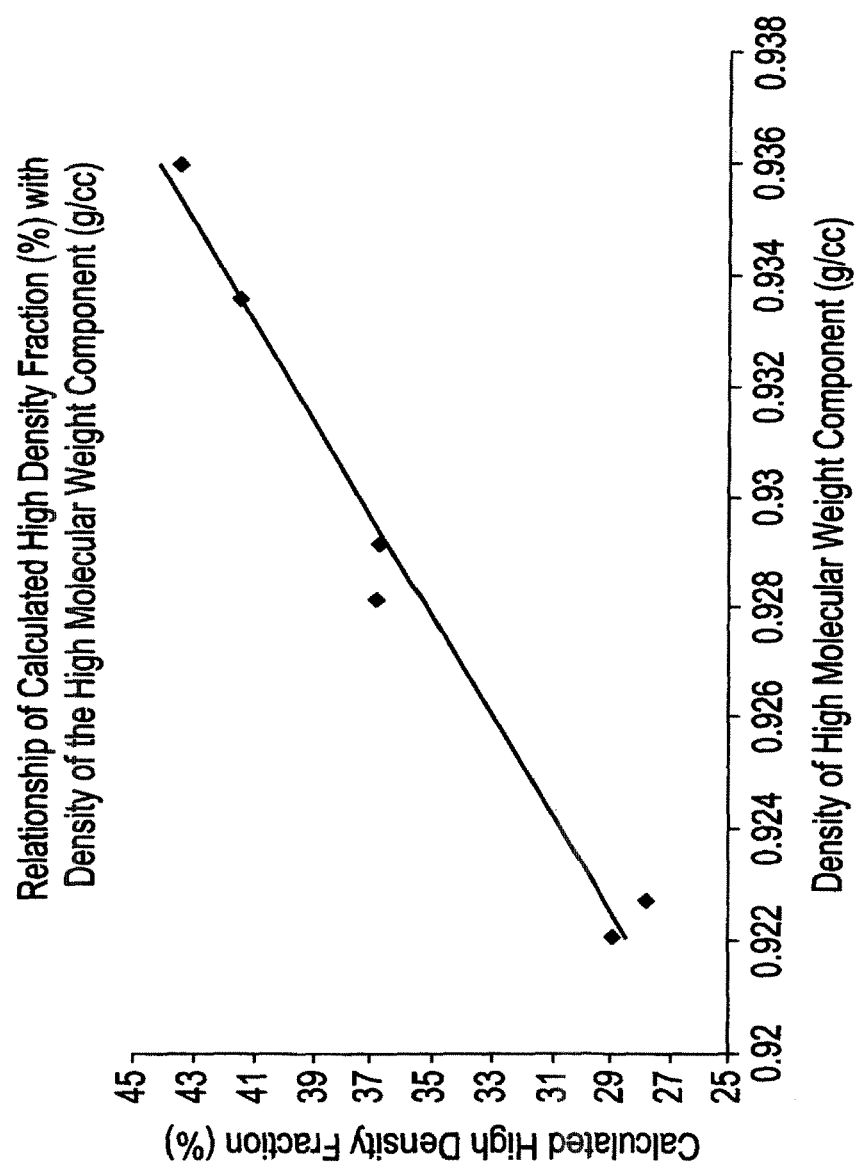
FIG. 3 is a graph illustrating the relationship between the calculated high density fraction measured via analytical temperature raising elution fractionation analysis (ATREF) and the density of the high molecular weight polyethylene component of the inventive high-density polyethylene composition.

Referring to FIG. 3, the calculated high density fraction in percent is equal to [1107.4*(density of the high molecular weight polyethylene component)−992.56]*[1(percent/(g/cm$^3$)].

Figure 4:
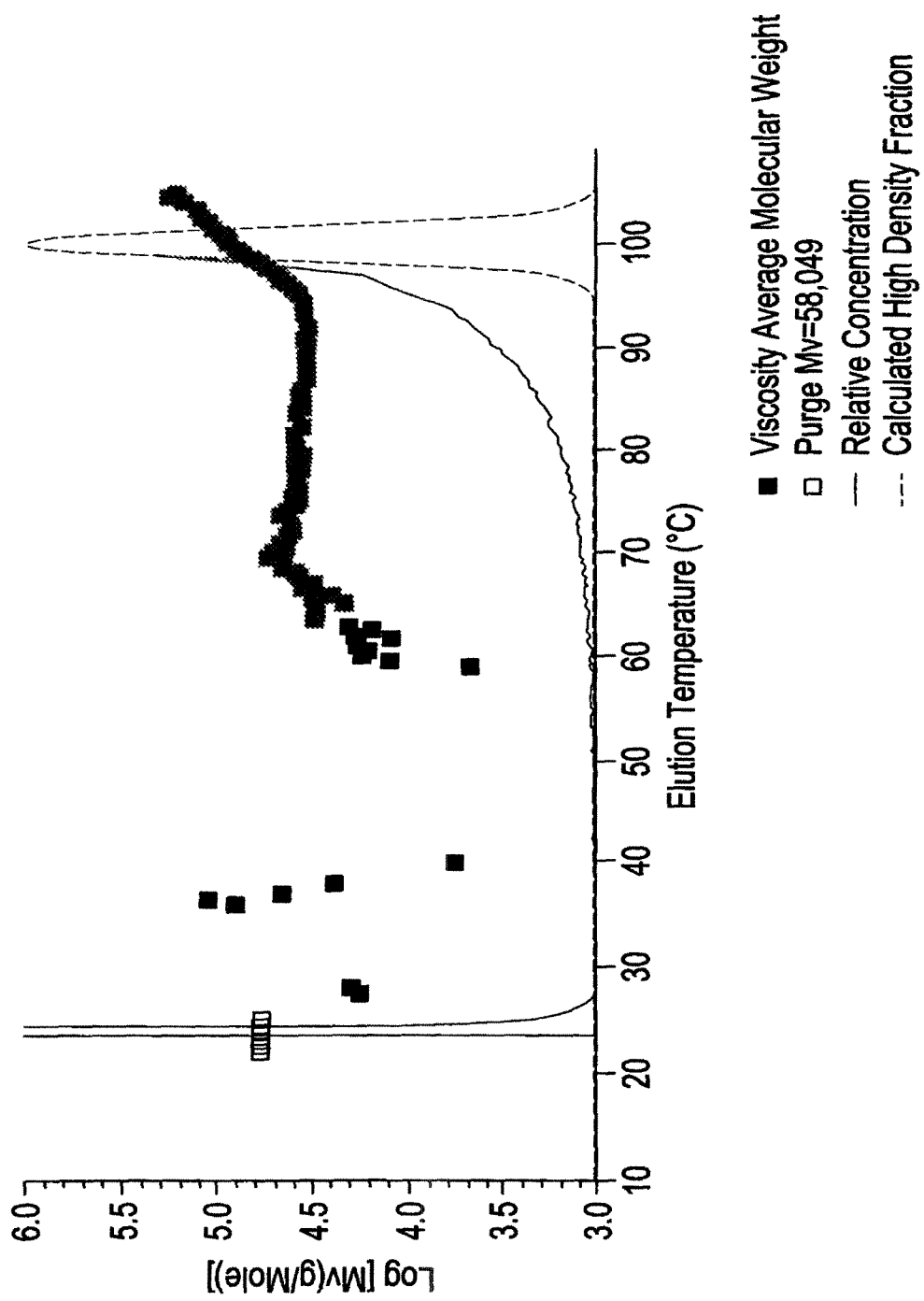
FIG. 4 illustrates how the calculated ATREF high-density fraction of the high molecular weight polyethylene component of the inventive Example 1 was determined.

Referring to FIG. 4, FIG. 4 illustrates the relationship between the elution temperatures in ° C. and viscosity average in Log [$M_v$(g/Mole)].

The high-density polyethylene composition may further include additional components such as other polymers, adjuvants, and/or additives. Such adjuvants or additives include, but are not limited to, antistatic agents, color enhancers, dyes, lubricants, fillers, pigments, primary antioxidants, secondary antioxidants, processing aids, UV stabilizers, nucleators, and combinations thereof. The high-density polyethylene composition compromises about less than 10 percent by the combined weight of one or more additives, based on the weight of the high-density polyethylene composition. All individual values and subranges from about less than 10 weight percent are included herein and disclosed herein; for example, the high-density polyethylene composition comprises about less than 5 percent by the combined weight of one or more additives, based on the weight of the high-density polyethylene composition; or in the alternative, the high-density polyethylene composition comprises about less than 1 percent by the combined weight of one or more additives, based on the weight of the high-density polyethylene composition; or in another alternative, the high-density polyethylene composition may compromise about less than 0.5 percent by the combined weight of one or more additives, based on the weight of the high-density polyethylene composition. Antioxidants, such as Irgafos® 168 and Irganox® 1010, are commonly used to protect the polymer from thermal and/or oxidative degradation. Irganox® 1010 is tetrakis(methylene (3,5-di-tert-butyl-4hydroxyhydrocinnamate), which is commercially available from Ciba Geigy Inc. Irgafos® 168 is tris (2,4 di-tert-butylphenyl)phosphite, which is commercially available from Ciba Geigy Inc.

The inventive high-density polyethylene composition may further be blended with other polymers. Such other polymers are generally known to a person of ordinary skill in the art. Blends comprising the inventive high-density polyethylene composition is formed via any conventional methods. For example, the selected polymers are melt blended via a single or twin screw extruder, or a mixer, for example a Banbury mixer, a Haake mixer, a Barbender internal mixer.

In general, blends containing the inventive high-density polyethylene composition comprises at least 40 percent by weight of the inventive high-density polyethylene composition, based on the total weight of the blend. All individual values and subranges in the range of at least 40 weight percent are included herein and disclosed herein; for example, the blend comprises at least 50 percent by weight of the inventive high-density polyethylene composition, based on the total weight of the blend; or in the alternative, the blend comprises at least 60 percent by weight of the inventive high-density polyethylene composition, based on the total weight of the blend; or in the alternative, the blend comprises at least 70 percent by weight of the inventive high-density polyethylene composition, based on the total weight of the blend; or in the alternative, the blend comprises at least 80 percent by weight of the inventive high-density polyethylene composition, based on the total weight of the blend; or in the alternative, the blend comprises at least 90 percent by weight of the inventive high-density polyethylene composition, based on the total weight of the blend; or in the alternative, the blend comprises at least 95 percent by weight of the inventive high-density polyethylene composition, based on the total weight of the blend; or in the alternative, the blend comprises at least 99.99 percent by weight of the inventive high-density polyethylene composition, based on the total weight of the blend.

Different polymerization reactions and catalyst systems may be employed to produce the inventive high-density polyethylene composition. Typical transition metal catalyst systems used to prepare the high-density polyethylene composition are magnesium/titanium based catalyst systems, exemplified by the catalyst system described in U.S. Pat. No. 4,302,565; vanadium based catalyst systems, such as those described in U.S. Pat. No. 4,508,842; U.S. Pat. No. 5,332,793; U.S. Pat. No. 5,342,907; and U.S. Pat. No. 5,410,003; and a metallocene catalyst system, such as those described in U.S. Pat. No. 4,937,299; U.S. Pat. No. 5,317,036; and U.S. Pat. No. 5,527,752. Catalyst systems that use molybdenum oxides on silica-alumina supports are also useful. Preferred catalyst systems for preparing the components for the inventive high-density polyethylene composition are Ziegler-Natta catalyst systems and metallocene catalyst systems.

In some embodiments, preferred catalysts used in the process to make the high-density polyethylene compositions are of the magnesium/titanium type. In particular, for the gas phase polymerizations, the catalyst is made from a precursor comprising magnesium and titanium chlorides in an electron donor solvent. This solution is often either deposited on a porous catalyst support, or a filler is added, which, on subsequent spray drying, provides additional mechanical strength to the particles. The solid particles from either support methods are often slurried in a diluent producing a high viscosity mixture, which is then used as catalyst precursor. Exemplary catalyst types are described in U.S. Pat. No. 6,187,866 and U.S. Pat. No. 5,290,745, the entire contents of both of which are herein. Precipitated/crystallized catalyst systems, such as those described in U.S. Pat. No. 6,511,935 and U.S. Pat. No. 6,248,831, the entire contents of both of which are herein, may also be used. Such catalysts may further be modified with one precursor activator. Such further modifications are described in US patent publication No.: US2006/0287445 A1.

Preferably the catalyst precursor has the formula $Mg_dTi(OR)_eX_f(ED)_g$ wherein R is an aliphatic or aromatic hydrocarbon radical having 1 to 14 carbon atoms or COR' wherein R' is a aliphatic or aromatic hydrocarbon radical having 1 to 14 carbon atoms; each OR group is the same or different; X is independently chlorine, bromine or iodine; ED is an electron donor; d is 0.5 to 56; e is 0, 1, or 2; f is 2 to 116; and g is >2 and up to 1.5*d+3. It is prepared from a titanium compound, a magnesium compound, and an electron donor.

The electron donor is an organic Lewis base, liquid at temperatures in the range of 0° C. to 200° C., in which the magnesium and titanium compounds are soluble. The electron donor compounds are sometimes also referred to as Lewis bases. The electron donor can be an alkyl ester of an aliphatic or aromatic carboxylic acid, an aliphatic ketone, an aliphatic amine, an aliphatic alcohol, an alkyl or cycloalkyl ether, or mixtures thereof, each electron donor having 2 to 20 carbon atoms. Among these electron donors, the preferred are alkyl and cycloalkyl ethers having 2 to 20 carbon atoms; dialkyl, diaryl, and alkylaryl ketones having 3 to 20 carbon atoms; and alkyl, alkoxy, and alkylalkoxy esters of alkyl and aryl carboxylic acids having 2 to 20 carbon atoms. The most preferred electron donor is tetrahydrofuran. Other examples of suitable electron donors are methyl formate, ethyl acetate, butyl acetate, ethyl ether, dioxane, di-n-propyl ether, dibutyl ether, ethanol, 1-butanol, ethyl formate, methyl acetate, ethyl anisate, ethylene carbonate, tetrahydropyran, and ethyl propionate.

While a large excess of electron donor may be used initially to provide the reaction product of titanium compound and electron donor, the final catalyst precursor contains approximately 1 to approximately 20 moles of electron donor per mole of titanium compound and preferably approximately 1 to approximately 10 moles of electron donor per mole of titanium compound.

Since the catalyst will act as a template for the growth of the polymer, it is essential that the catalyst precursor be converted into a solid. It is also essential that the resultant solid has the appropriate particle size and shape to produce polymer particles with relatively narrow size distribution, low amounts of fines and good fluidization characteristics. Although this solution of Lewis Base, magnesium and titanium compounds may be impregnated into a porous support and dried to form a solid catalyst; it is preferred that the solution be converted into a solid catalyst via spray drying. Each of these methods thus forms a "supported catalyst precursor."

The spray dried catalyst product is then preferentially placed into a mineral oil slurry. The viscosity of the hydrocarbon slurry diluent is sufficiently low, so that the slurry can be conveniently pumped through the pre-activation apparatus, and eventually into the polymerization reactor. The catalyst is fed using a slurry catalyst feeder. A progressive cavity pump, such as a Moyno pump is typically used in commercial reaction systems, while a dual piston syringe pump is typically used in pilot scale reaction systems, where the catalyst flows are less than, or equal to, 10 cm$^3$/hour (2.78×10$^{-9}$ m$^3$/s) of slurry.

A cocatalyst, or activator, is also fed to the reactor to effect the polymerization. Complete activation by additional cocatalyst is required to achieve full activity. The complete activation normally occurs in the polymerization reactor, although the techniques taught in EP 1,200,483 may also be used.

The cocatalysts, which are reducing agents, conventionally used, are comprised of aluminum compounds, but compounds of lithium, sodium and potassium, alkaline earth metals, as well as compounds of other earth metals than aluminum are possible. The compounds are usually hydrides, organometal or halide compounds. Butyl lithium and dibutyl magnesium are examples of useful compounds of other than aluminum.

An activator compound, which is generally used with any of the titanium based catalyst precursors, can have the formula AlR$_a$X$_b$H$_c$, wherein each X is independently chlorine, bromine, iodine, or OR'; each R and R' is independently a saturated aliphatic hydrocarbon radical having 1 to 14 carbon atoms; b is 0 to 1.5; c is 0 or 1; and a+b+c=3. Preferred activators include alkylaluminum mono- and dichlorides, wherein each alkyl radical has 1 to 6 carbon atoms and the trialkylaluminums. Examples are diethylaluminum chloride and tri-n-hexylaluminum. About 0.10 to 10 moles, and preferably 0.15 to 2.5 moles, of activator are used per mole of electron donor. The molar ratio of activator to titanium is in the range from 1:1 to 10:1, and is preferably in the range from 2:1 to 5:1.

The hydrocarbyl aluminum cocatalyst can be represented by the formula R$_3$Al or R$_2$AlX, wherein each R is independently alkyl, cycloalkyl, aryl, or hydrogen; at least one R is hydrocarbyl; and two or three R radicals can be joined to form a heterocyclic structure. Each R, which is a hydrocarbyl radical, can have 1 to 20 carbon atoms, and preferably has 1 to 10 carbon atoms. X is a halogen, preferably chlorine, bromine, or iodine. Examples of hydrocarbyl aluminum compounds are as follows: triisobutylaluminum, tri-n-hexylaluminum, di-isobutyl-aluminum hydride, dihexylaluminum hydride, di-isobutylhexylaluminum, isobutyl dihexylaluminum, trimethylaluminum, triethylaluminum, tripropylaluminum, tri-isopropylaluminum, tri-n-butylaluminum, trioctylaluminum, tridecylaluminum, tridodecylaluminum, tribenzylaluminum, triphenylaluminum, trinaphthylaluminum, tritolylaluminum, dibutylaluminum chloride, diethylaluminum chloride, and ethylaluminum sesquichloride. The cocatalyst compounds can also serve as activators and modifiers.

Activators can be added to the precursor either before and/or during polymerization. In one procedure, the precursor is fully activated before polymerization. In another procedure, the precursor is partially activated before polymerization, and activation is completed in the reactor. Where a modifier is used instead of an activator, the modifiers are usually dissolved in an organic solvent such as isopentane and, where a support is used, impregnated into the support following impregnation of the titanium compound or complex, after which the supported catalyst precursor is dried. Otherwise, the modifier solution is added by itself directly to the reactor. Modifiers are similar in chemical structure and function to the activators as are cocatalysts. For variations, see for example, U.S. Pat. No. 5,106,926, incorporated herein by reference in its entirety. The cocatalyst is preferably added separately neat or as a solution in an inert solvent, such as isopentane, to the polymerization reactor at the same time as the flow of ethylene is initiated.

In those embodiments that use a support, the precursor is supported on an inorganic oxide support such as silica, aluminum phosphate, alumina, silica/alumina mixtures, silica that has been modified with an organoaluminum compound such as triethyl aluminum, and silica modified with diethyl zinc. In some embodiments silica is a preferred support. A typical support is a solid, particulate, porous material essentially inert to the polymerization. It is used as a dry powder having an average particle size of 10 to 250 μm and preferably 30 to 100 μm; a surface area of at least 200 m$^2$/g and preferably at least 250 m$^2$/g; and a pore size of at least 100×10$^{-10}$ m and preferably at least 200×10$^{-10}$ m. Generally, the amount of support used is that which will provide 0.1 to 1.0 millimole of titanium per gram of support and preferably 0.4 to 0.9 millimole of titanium per gram of support Impregnation of the above mentioned catalyst precursor into a silica support can be accomplished by mixing the precursor and silica gel in the electron donor solvent or other solvent followed by solvent removal under reduced pressure. When a support is not desired, the catalyst precursor can be used in liquid form.

In another embodiment, metallocene catalysts, single-site catalysts and constrained geometry catalysts may be used in the practice of the invention. Generally, metallocene catalyst compounds include half and full sandwich compounds having one or more π-bonded ligands including cyclopentadienyl-type structures or other similar functioning structure such as pentadiene, cyclooctatetraendiyl and imides. Typical compounds are generally described as containing one or more ligands capable of π-bonding to a transition metal atom, usually, cyclopentadienyl derived ligands or moieties, in combination with a transition metal selected from Group 3 to 8, preferably 4, 5 or 6 or from the lanthanide and actinide series of the Periodic Table of Elements.

Exemplary of metallocene-type catalyst compounds are described in, for example, U.S. Pat. Nos. 4,530,914; 4,871,705; 4,937,299; 5,017,714; 5,055,438; 5,096,867; 5,120,867; 5,124,418; 5,198,401; 5,210,352; 5,229,478; 5,264,405; 5,278,264; 5,278,119; 5,304,614; 5,324,800; 5,347,025; 5,350,723; 5,384,299; 5,391,790; 5,391,789; 5,399,636; 5,408,017; 5,491,207; 5,455,366; 5,534,473; 5,539,124; 5,554,775; 5,621,126; 5,684,098; 5,693,730; 5,698,634; 5,710,297; 5,712,354; 5,714,427; 5,714,555; 5,728,641; 5,728,839; 5,753,577; 5,767,209; 5,770,753 and 5,770,664; European publications: EP-A-0 591 756; EP-A-0 520 732; EP-A-0 420 436; EP-A-0 485 822; EP-A-0 485 823; EP-A-0 743 324; EP-A-0 518 092; and PCT publications: WO 91/04257; WO 92/00333; WO 93/08221; WO 93/08199; WO 94/01471; WO 96/20233; WO 97/15582; WO 97/19959; WO 97/46567; WO 98/01455; WO 98/06759 and WO 98/011144. All of these references are incorporated herein, in their entirety, by reference.

Suitable catalysts for use herein, preferably include constrained geometry catalysts as disclosed in U.S. Pat. Nos. 5,272,236 and 5,278,272, which are both incorporated, in their entirety, by reference.

The monocyclopentadienyl transition metal olefin polymerization catalysts taught in U.S. Pat. No. 5,026,798, the teachings of which are incorporated herein by reference, are also suitable as catalysts of the invention.

The foregoing catalysts may be further described as comprising a metal coordination complex comprising a metal of groups 3-10 or the Lanthanide series of the Periodic Table of the Elements, and a delocalized π-bonded moiety, substituted with a constrain-inducing moiety. Such a complex has a constrained geometry about the metal atom. The catalyst further comprises an activating cocatalyst.

Any conventional ethylene homopolymerization or (co) polymerization reactions may be employed to produce the inventive high-density polyethylene composition. Such conventional ethylene homopolymerization or (co)polymerization reactions include, but are not limited to, gas phase polymerization, slurry phase polymerization, liquid phase polymerization, and combinations thereof using conventional reactors, for example gas phase reactors, loop reactors, stirred tank reactors, and batch reactors in series, or in series and parallel. The polymerization system of the instant invention is a dual sequential polymerization system or a multi-sequential polymerization system. Examples of dual sequential polymerization system include, but are not limited to, gas phase polymerization/gas phase polymerization; gas phase polymerization/liquid phase polymerization; liquid phase polymerization/gas phase polymerization; liquid phase polymerization/liquid phase polymerization; slurry phase polymerization/slurry phase polymerization; liquid phase polymerization/slurry phase polymerization; slurry phase polymerization/liquid phase polymerization; slurry phase polymerization/gas phase polymerization; and gas phase polymerization/slurry phase polymerization. The multi-sequential polymerization systems includes at least three polymerization reactions. The catalyst system, described above, may also be a conventional catalyst system. The inventive high-density polyethylene composition is preferably produced via a dual gas phase polymerization process, for example gas phase polymerization/gas phase polymerization; however, the instant invention is not so limited, and any of the above combinations may be employed.

In production, a dual sequential polymerization system connected in series, as described above, may be used. The first component, that is the high molecular weight ethylene polymer, can be produced in the first stage of the dual sequential polymerization system, and the second component, that is the low molecular weight ethylene polymer, can be prepared in the second stage of the dual sequential polymerization system. Alternatively, the second component, that is the low molecular weight ethylene polymer, can be made in the first stage of the dual sequential polymerization system, and the first component, that is the high molecular weight ethylene polymer, can be made in the second stage of the dual sequential polymerization system.

For purposes of the present disclosure, the reactor, in which the conditions are conducive to making the first component is known as the first reactor. Alternatively, the reactor in which the conditions are conducive to making the second component is known as the second reactor.

In production, a catalyst system including a cocatalyst, ethylene, one or more alpha-olefin comonomers, hydrogen, and optionally inert gases and/or liquids, for example $N_2$, isopentane, and hexane, are continuously fed into a first reactor, which is connected to a second reactor in series; the first component/active catalyst mixture is then continuously transferred, for example, in batches from the first reactor to the second reactor. Ethylene, hydrogen, cocatalyst, and optionally inert gases and/or liquids, for example $N_2$, isopentane, hexane, are continuously fed to the second reactor, and the final product, that is the inventive high-density polyethylene composition, is continuously removed, for example, in batches from the second reactor. A preferred mode is to take batch quantities of first component from the first reactor, and transfer these to the second reactor using the differential pressure generated by a recycled gas compression system. The inventive high-density polyethylene composition is then transferred to a purge bin under inert atmosphere conditions. Subsequently, the residual hydrocarbons are removed, and moisture is introduced to reduce any residual aluminum alkyls and any residual catalysts before the inventive high-density polyethylene composition is exposed to oxygen. The inventive high-density polyethylene composition is then transferred to an extruder to be pelletized. Such pelletization techniques are generally known. The inventive high-density polyethylene composition may further be melt screened. Subsequent to the melting process in the extruder, the molten composition is passed through one or more active screens (positioned in series of more than one) with each active screen having a micron retention size of from 2 to 400 (2 to $4\times10^{-5}$ m), and preferably 2 to 300 (2 to $3\times10^{-5}$ m), and most preferably 2 to 70 (2 to $7\times10^{-6}$ m), at a mass flux of 5 to 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In an alternative production, a multi-sequential polymerization system connected in series and parallel, as described above, may be used. In one embodiment of the instant invention, a catalyst system including a cocatalyst, ethylene, one or more alpha-olefin comonomers, hydrogen, and optionally inert gases and/or liquids, for example $N_2$, isopentane, and hexane, are continuously fed into a first reactor, which is connected to a second reactor, wherein the second reactor is connected to a third reactor in series; the first component/ active catalyst mixture is then continuously transferred, for example, in batches from the first reactor to the second reactor, and then to the third reactor. Ethylene, hydrogen, cocatalyst, and optionally inert gases and/or liquids, for example $N_2$, isopentane, and hexane, are continuously fed to the second and third reactors, and the final product, that is high-density polyethylene composition, is continuously removed, for example, in batches from the third reactor. A preferred mode is to take batch quantities of first component from the first reactor, and transfer these to the second reactor, and then take batches from the second reactor and transfer these to the third reactor in series using the differential pressure generated by a recycled gas compression system. Alternatively, the first reactor may feed to both a second reactor and a third reactor in parallel, and the product from first reactor may be transferred to either second or third reactor. The high-density polyethylene composition is then transferred to a purge bin under inert atmosphere conditions. Subsequently, the residual hydrocarbons are removed, and moisture may be introduced to reduce any residual aluminum alkyls and any residual catalysts before the polymer, that is the inventive high-density polyethylene composition, is exposed to oxygen. The inventive high-density polyethylene composition is then transferred to an extruder to be pelletized. Such pelletization techniques are generally known. The inventive high-density polyethylene composition may further be melt screened. Subsequent to the melting process in the extruder, the molten composition is passed through one or more active screens (positioned in series of more than one) with each active screen having a micron retention size of from 2 to 400 (2 to $4\times10^{-5}$ m), and preferably 2 to 300 (2 to $3\times10^{-5}$ m), and most preferably 2 to 70 (2 to $7\times10^{-6}$ m), at a mass flux of 5 to 100 lb/hr/in$^2$ (1.0 to about 20 kg/s/m$^2$). Such further melt screening is disclosed in U.S. Pat. No. 6,485,662, which is incorporated herein by reference to the extent that it discloses melt screening.

In another alternative production, the inventive high-density polyethylene composition may be produced from polymers made in two or more independent reactors (each using the same or different catalyst) with post reaction blending.

In application, the inventive high-density polyethylene composition may be used to manufacture shaped articles. Such articles may include, but are not limited to, closure devices such as bottle caps, wire cable jacketing, conduit pipes, or injection blow molded articles. Different methods may be employed to manufacture articles such as bottle caps, wire cable jacketing, conduit pipes, or injection blow molded articles, for example injection blow molded bottles. Suitable conversion techniques include, but are not limited to, wire coating, pipe extrusion, blow molding, co-extrusion blow molding, injection molding, injection blow molding, injection stretch blow molding, compression molding, extrusion, pultrusion, and calendering. Such techniques are generally well known. Preferred conversion techniques include wire coating, pipe extrusion, injection blow molding, compression molding, and injection molding.

In compression molding process, a two-piece mold provides a cavity having the shape of a desired molded article. The mold is heated. An appropriate amount of the inventive high-density polyethylene composition, preferably in a molten form, is loaded into the lower half of the mold. The two parts of the mold are brought together under pressure. The inventive high-density polyethylene composition, softened by heat, is thereby welded into a continuous mass having the shape of the cavity. The continuous mass is hardened via chilling, under pressure, in the mold, thereby forming a compression molded article, for example bottle cap. The compression molded cap may include a skirt that axially extends from the periphery of a base, and may further include internal threads for securing the cap to a container.

In injection molding process, the inventive high-density polyethylene composition is fed into an extruder via a hopper. The extruder conveys, heats, melts, and pressurizes the inventive high-density polyethylene composition to a form a molten stream. The molten stream is forced out of the extruder through a nozzle into a relatively cool mold held closed under pressure thereby filling the mold. The melt cools and hardens until fully set-up. The mold then opens and the molded article, for example bottle cap, is removed. The injection molded cap may include a skirt that axially extends from the periphery of a base, and may further include internal threads for securing the cap to a container.

In blow molding process, for example injection blow molding, the inventive high-density polyethylene composition is melted, and then, it is formed into a tube or parison via injection molding. The ends of the tube or parison is sealed, except for an area in which the blowing air can enter. The sealed tube or parison is inflated inside of a mold thereby taking the shape of the mold. The molded article, for example bottle, is cooled, and then ejected from the mold. If necessary, the molded article is then trimmed.

Closure devices such as bottle caps including the inventive high-density polyethylene composition exhibit improved environmental crack resistance. Such bottle caps are adapted to withstand the pressure of carbonated drinks. Such bottle caps further facilitate closure, and sealing of a bottle, that is optimum torque provided by a machine to screw the cap on the bottle, or unsealing a bottle, that is optimum torque provide by a person to unscrew the cap.

EXAMPLES

It is understood that the present invention is operable in the absence of any component, which has not been specifically disclosed. The following examples are provided in order to further illustrate the invention and are not to be construed as limiting.

Inventive Examples 1-6

Inventive Examples 1-6 were prepared according to the following procedures: a dual-sequential polymerization system, for example a first gas phase reactor and a second gas phase reactor operating in series, was provided. Ethylene, one or more alpha-olefin comonomers, hydrogen, catalyst, for example Ziegler-Natta catalyst, slurried in mineral oil, $N_2$, and isopentane were fed continuously into the first reactor. Subsequently, a cocatalyst, for example triethylaluminum (TEAL), was fed continuously into the first reactor to activate the catalyst. The first polymerization reaction of the ethylene in the presence of 1-hexene was carried out in the first reactor under the conditions shown below in Table I thereby producing first component-catalyst complex. The first component-catalyst complex was continuously transferred to the second reactor. Additional, ethylene, hydrogen, cocatalyst, for example TEAL, $N_2$, and isopentane were fed continuously into the second reactor. No additional catalyst was added to the second reactor. The second polymerization reaction of ethylene was carried out in the second reactor under the conditions shown below in Table I thereby producing the first component-catalyst-second component complex. The first component-catalyst-second component complex was continuously removed from the second reactor in batches into the product chamber, where it was purged to remove residual hydrocarbons, and then transferred to a fiberpak drum. The fiberpak drum was continuously purged with humidified nitrogen. The polymer, that is the inventive high-density polyethylene composition, was further processed in a mixer/pelletizer. Additional additives, as shown in Table III, were added to the polymer, that is the inventive high-density polyethylene composition. The polymer, that is the inventive high-density polyethylene composition, was melted in the mixer, and additives were dispersed therein the polymer, inventive high-density polyethylene composition, matrix. The inventive high-density polyethylene composition was extruded through a die plate, pelletized, and cooled. The resin samples of the inventive examples 1-6 were tested for their properties from pellets, or were formed into testing plaques according to ASTM D-4703-00 and then were tested for their properties. Such properties are shown in Tables I and II, and FIGS. 1-4.

Comparative Examples A-E

Comparative example A is commercially available under the tradename Borstar® MB6561 from Borealis AIS, Denmark. Comparative example B is commercially available under the tradename Rigidex® HD 5130 EA-B from BP Solvay Polyethylene. Comparative example C is commercially available under the tradename XZ 89719.01 from The Dow Chemical Company, USA. Comparative example D is commercially available under the tradename Hostaen® GX4027 from Basell, Germany. Comparative example E is commercially available under the tradename XZ 89719.00 from The Dow Chemical Company, USA. The resin samples of the comparative examples A-E were tested for their properties from pellets, or were formed into testing plaques according to ASTM D-4703-00 and then tested for their properties. The resin samples of the comparative examples A-E and the plaques made therefrom were tested for their properties. Such properties are shown in Tables IV.

Test Methods

Unless otherwise noted, the values reported herein were determined according to the following test methods.

Density (g/cm$^3$) was measured according to ASTM-D 792-03, Method B, in isopropanol. Specimens were measured within 1 hour of molding after conditioning in the isopropanol bath at 23° C. for 8 min to achieve thermal equilibrium prior to measurement. The specimens were compression molded according to ASTM D-4703-00 Annex A with a 5 min initial heating period at about 190° C. and a 15° C./min cooling rate per Procedure C. The specimen was cooled to 45° C. in the press with continued cooling until "cool to the touch."

Melt index ($I_2$) was measured at 190° C. under a load of 2.16 kg according to ASTM D-1238-03.

Melt index ($I_5$) was measured at 190° C. under a load of 5.0 kg according to ASTM D-1238-03.

Melt index ($I_{10}$) was measured at 190° C. under a load of 10.0 kg according to ASTM D-1238-03.

Melt index ($I_{21.6}$) was measured at 190° C. under a load of 21.6 kg according to ASTM D-1238-03.

Weight average molecular weight ($M_w$) and number average molecular weight ($M_n$) were determined according to methods known in the art using conventional GPC, as described herein below.

The molecular weight distributions of ethylene polymers were determined by gel permeation chromatography (GPC). The chromatographic system consisted of a Waters (Millford, Mass.) 150° C. high temperature gel permeation chromatograph, equipped with a Precision Detectors (Amherst, Mass.) 2-angle laser light scattering detector Model 2040. The 15° angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were four Shodex HT 806M 300 mm, 13 μm columns and one Shodex HT803M 150 mm, 12 μm column. The solvent used was 1,2,4 trichlorobenzene. The samples were prepared at a concentration of 0.1 grams of polymer in 50 milliliters of solvent. The chromatographic solvent and the sample preparation solvent contained 200 μg/g of butylated hydroxytoluene (BHT). Both solvent sources were nitrogen sparged. Polyethylene samples were stirred gently at 160° C. for 4 hours. The injection volume used was 200 microliters, and the flow rate was 0.67 milliliters/min. Calibration of the GPC column set was performed with 21 narrow molecular weight distribution polystyrene standards, with molecular weights ranging from 580 to 8,400,000 g/mol, which were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to, or greater than, 1,000,000 g/mol, and 0.05 grams in 50 milliliters of solvent for molecular weights less than 1,000,000 g/mol. The polystyrene standards were dissolved at 80° C. with gentle agitation for 30 minutes. The narrow standards mixtures were run first, and in order of decreasing highest molecular weight component, to minimize degradation. The polystyrene standard peak molecular weights were converted to polyethylene molecular weights using the following equation (as described in Williams and Ward, *J. Polym. Sci., Polym. Let.*, 6, 621 (1968)):

$$M\text{polyethylene} = A \times (M\text{polystyrene})^B,$$

where M is the molecular weight, A has a value of 0.41 and B is equal to 1.0. The Systematic Approach for the determination of multi-detector offsets was done in a manner consistent with that published by Balke, Mourey, et al. (Mourey and Balke, *Chromatography Polym.* Chpt 12, (1992) and Balke, Thitiratsakul, Lew, Cheung, Mourey, *Chromatography Polym.* Chpt 13, (1992)), optimizing dual detector log results from Dow broad polystyrene 1683 to the narrow standard column calibration results from the narrow standards calibration curve using in-house software. The molecular weight data for off-set determination was obtained in a manner consistent with that published by Zimm (Zimm, B. H., *J. Chem. Phys.*, 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 g/mol molecular weight, which was measured in reference to NIST polyethylene homopolymer standard 1475. The chromatographic concentrations were assumed low enough to eliminate addressing $2^{nd}$ Virial coefficient effects (concentration effects on molecular weight). Molecular weight calculations were performed using in-house software. The calculation of the number-average molecular weight, weight-average molecular weight, and z-average molecular weight were made according to the following equations, assuming that the refractometer signal is directly proportional to weight fraction. The baseline-subtracted refractometer signal can be directly substituted for weight fraction in the equations below. Note that the molecular weight can be from the conventional calibration curve or the absolute molecular weight from the light scattering to refractometer ratio. An improved estimation of z-average molecular weight, the baseline-subtracted light scattering signal can be substituted for the product of weight average molecular weight and weight fraction in equation (2) below:

$$a)\ \overline{Mn} = \frac{\sum_{i} Wf_i}{\sum_{i} (Wf_i / M_i)} \qquad (2)$$

$$b)\ \overline{Mw} = \frac{\sum_{i} (Wf_i * M_i)}{\sum_{i} Wf_i}$$

c) $\overline{Mz} = \dfrac{\sum\limits_{i} (Wf_i * M_i^2)}{\sum\limits_{i} (Wf_i * M_i)}$ Bimodality of distributions was characterized according to the weight fraction of the highest temperature peak in temperature rising elution fractionation (typically abbreviated as "TREF") data as described, for example, in Wild et al., *Journal of Polymer Science, Poly. Phys. Ed.*, Vol. 20, p. 441 (1982), in U.S. Pat. No. 4,798,081 (Hazlitt et al.), or in U.S. Pat. No. 5,089,321 (Chum et al.), the disclosures of all of which are incorporated herein by reference. In analytical temperature rising elution fractionation analysis (as described in U.S. Pat. No. 4,798,081 and abbreviated herein as "ATREF"), the composition to be analyzed is dissolved in a suitable hot solvent (for example, 1,2,4 trichlorobenzene), and allowed to crystallized in a column containing an inert support (for example, stainless steel shot) by slowly reducing the temperature. The column was equipped with both an infra-red detector and a differential viscometer (DV) detector. An ATREF-DV chromatogram curve was then generated by eluting the crystallized polymer sample from the column by slowly increasing the temperature of the eluting solvent (1,2,4 trichlorobenzene). The ATREF-DV method is described in further detail in WO 99/14271, the disclosure of which is incorporated herein by reference.

High Density Fraction (percent) was measured via analytical temperature rising elution fractionation analysis (as described in U.S. Pat. No. 4,798,081 and abbreviated herein as "ATREF"), which is described in further details hereinafter. Analytical temperature rising elution fractionation (ATREF) analysis was conducted according to the method described in U.S. Pat. No. 4,798,081 and Wilde, L.; Ryle, T. R.; Knobeloch, D. C.; Peat, I. R.; *Determination of Branching Distributions in Polyethylene and Ethylene Copolymers*, J. Polym. Sci., 20, 441-455 (1982), which are herein in their entirety. The composition to be analyzed was dissolved in trichlorobenzene and allowed to crystallize in a column containing an inert support (stainless steel shot) by slowly reducing the temperature to 20° C. at a cooling rate of 0.1° C./min. The column was equipped with an infrared detector. An ATREF chromatogram curve was then generated by eluting the crystallized polymer sample from the column by slowly increasing the temperature of the eluting solvent (trichlorobenzene) from 20 to 120° C. at a rate of 1.5° C./min.

Branching distributions were determined via crystallization analysis fractionation (CRYSTAF); described herein below. Crystallization analysis fractionation (CRYSTAF) was conducted via a CRYSTAF 200 unit commercially available from PolymerChar, Valencia, Spain. The samples were dissolved in 1,2,4 trichlorobenzene at 160° C. (0.66 mg/mL) for 1 hr and stabilized at 95° C. for 45 minutes. The sampling temperatures ranged from 95 to 30° C. at a cooling rate of 0.2° C./min. An infrared detector was used to measure the polymer solution concentrations. The cumulative soluble concentration was measured as the polymer crystallizes while the temperature was decreased. The analytical derivative of the cumulative profile reflects the short chain branching distribution of the polymer.

The CRYSTAF temperature peak and area are identified by the peak analysis module included in the CRYSTAF Software (Version 2001.b, PolymerChar, Valencia, Spain). The CRYSTAF peak finding routine identifies a temperature peak as a maximum in the dW/dT curve and the area between the largest positive inflections on either side of the identified peak in the derivative curve. To calculate the CRYSTAF curve, the preferred processing parameters are with a temperature limit of 70° C. and with smoothing parameters above the temperature limit of 0.1, and below the temperature limit of 0.3.

Solubility Distribution Breadth Index (SDBI) is the statistical value for the breadth of the CRYSTAF method which is calculated based on the following formula:

$$SDBI = \int \sqrt[4]{(T-T_w)^4 \cdot w(T) dT}$$

$$T_w = \int T \cdot w(T) dT$$

$$\int w(T) dT = 1$$

wherein T is temperature, W is weight fraction, and $T_W$ weight average temperature.

Long Chain Branching was determined according to the methods known in the art, such as gel permeation chromatography coupled with low angle laser light scattering detector (GPC-LALLS) and gel permeation chromatography coupled with a differential viscometer detector (GPC-DV).

Resin stiffness was characterized by measuring the Flexural Modulus at 5 percent strain and Secant Modulii at 1 percent and 2 percent strain, and a test speed of 0.5 inch/min (13 mm/min) according to ASTM D 790-99 Method B.

Tensile strength at yield and elongation at break were measured according to ASTM D-638-03 employing Type IV Specimen at 2 inch/minute (50 mm/minute).

The environmental stress crack resistance (ESCR) was measured according to ASTM-D 1693-01, Condition B. The susceptibility of the resin to mechanical failure by cracking was measured under constant strain conditions, and in the presence of a crack accelerating agent such as soaps, wetting agents, etc. Measurements were carried out on notched specimens, in a 10 percent, by volume, Igepal CO-630 (vendor Rhone-Poulec, N.J.) aqueous solution, maintained at 50° C., and a 100 percent, by volume, Igepal CO-630 (vendor Rhone-Poulec, N.J.) aqueous solution, maintained at 50° C. The ESCR value was reported as $F_{50}$, the calculated 50 percent failure time from the probability graph, and $F_0$, where there are no failures in the trial.

Short chain branching distribution and comonomer content was measured using $C_{13}$ NMR, as discussed in Randall, *Rev. Macromol. Chem. Chys.*, C29 (2&3), pp. 285-297, and in U.S. Pat. No. 5,292,845, the disclosures of which are incorporated herein by reference to the extent related to such measurement. The samples were prepared by adding approximately 3 g of a 50/50 mixture of tetrachloroethane-d2/orthodichlorobenzene that was 0.025M in chromium acetylacetonate (relaxation agent) to 0.4 g sample in a 10 mm NMR tube. The samples were dissolved and homogenized by heating the tube and its contents to 150° C. The data was collected using a JEOL Eclipse 400 MHz NMR spectrometer, corresponding to a 13C resonance frequency of 100.6 MHz. Acquisition parameters were selected to ensure quantitative 13C data acquisition in the presence of the relaxation agent. The data was acquired using gated 1H decoupling, 4000 transients per data file, a 4.7 sec relaxation delay and 1.3 second acquisition time, a spectral width of 24,200 Hz and a file size of 64K data points, with the probe head heated to 130° C. The spectra were referenced to the methylene peak at 30 ppm. The results were calculated according to ASTM method D5017-91.

The resin rheology was measured on the ARES I (Advanced Rheometric Expansion System) Rheometer. The ARES I was a strain controlled rheometer. A rotary actuator (servomotor) applied shear deformation in the form of strain to a sample. In response, the sample generated torque, which was measured by the transducer. Strain and torque were used to calculate dynamic mechanical properties, such as modulus and viscosity. The viscoelastic properties of the sample were measured in the melt using a 25 mm in diameter parallel plate set up, at constant strain (5 percent) and temperature (190° C.) and $N_2$ purge, and as a function of varying frequency (0.01 to 500 $s^{-1}$). The storage modulus, loss modulus, tan delta, and complex viscosity of the resin were determined using Rheometrics Orchestrator software (v. 6.5.8). The viscosity ratio (0.1 rad*$s^{-1}$/100 rad*$s^{-1}$) was determined to be the ratio of the viscosity measured at a shear rate of 0.1 rad/s to the viscosity measured at a shear rate of 100 rad/s.

Vinyl unsaturations were measured according to ASTM D-6248-98.

Low shear rheological characterization is performed on a Rheometrics SR5000 in stress controlled mode, using a 25 mm parallel plates fixture. This type of geometry is preferred to cone and plate because it requires only minimal squeezing flow during sample loading, thus reducing residual stresses.

g' average was determined according to the following procedure. The chromatographic system consisted of a Waters (Millford, Mass.) 150° C. high temperature chromatograph equipped with a Precision Detectors (Amherst, Mass.) 2-angle laser light scattering detector Model 2040, an IR4 infra-red detector from Polymer Char (Valencia, Spain), and a Viscotek (Houston, Tex.) 150R 4-capillary viscometer. The 15-degree angle of the light scattering detector was used for calculation purposes. Data collection was performed using Viscotek TriSEC software version 3 and a 4-channel Viscotek Data Manager DM400. The system was equipped with an on-line solvent degas device from Polymer Laboratories. The carousel compartment was operated at 140° C. and the column compartment was operated at 150° C. The columns used were 4 20-micron mixed-bed light scattering "Mixed A-LS" columns from Polymer Laboratories. The solvent used was 1,2,4 trichlorobenzene. The samples were prepared at a concentration of 0.1 grams of polymer in 50 milliliters of solvent. The chromatographic solvent and the sample preparation solvent contained 200 ppm of butylated hydroxytoluene (BHT). Both solvent sources were nitrogen sparged. Polyethylene samples were stirred gently at 160 degrees Celsius for 4 hours. The injection volume used was 200 microliters and the flow rate was 1 milliliters/minute.

Calibration of the GPC column set was performed with 21 narrow molecular weight distribution polystyrene standards with molecular weights ranging from 580 to 8,400,000, and were arranged in 6 "cocktail" mixtures with at least a decade of separation between individual molecular weights. The standards were purchased from Polymer Laboratories (Shropshire, UK). The polystyrene standards were prepared at 0.025 grams in 50 milliliters of solvent for molecular weights equal to or greater than 1,000,000, and 0.05 grams in 50 milliliters of solvent for molecular weights less than 1,000,000. The polystyrene standards were dissolved at 80° C. with gentle agitation for 30 minutes. The narrow standards mixtures were run first and in order of decreasing highest molecular weight component to minimize degradation. The polystyrene standard peak molecular weights were converted to polyethylene molecular weights using the following equation (as described in Williams and Ward, *J. Polym. Sci., Polym. Let.*, 6, 621 (1968)).:

$M$polyethylene=$A$×($M$polystyrene)$^B$

Where M is the molecular weight, A has a value of 0.43 and B is equal to 1.0.

The Systematic Approach for the determination of multi-detector offsets was done in a manner consistent with that published by Balke, Mourey, et. al. (Mourey and Balke, *Chromatography Polym.* Chpt 12, (1992)) (Balke, Thitiratsakul, Lew, Cheung, Mourey, *Chromatography Polym.* Chpt 13, (1992)), optimizing triple detector log (MW and IV) results from Dow Broad Polystyrene 1683 to the narrow standard column calibration results from the narrow standards calibration curve using a software. The molecular weight data for off-set determination was obtained in a manner consistent with that published by Zimm (Zimm, B. H., J. Chem. Phys., 16, 1099 (1948)) and Kratochvil (Kratochvil, P., *Classical Light Scattering from Polymer Solutions*, Elsevier, Oxford, N.Y. (1987)). The overall injected concentration used for the determination of the molecular weight was obtained from the sample refractive index area and the refractive index detector calibration from a linear polyethylene homopolymer of 115,000 molecular weight. The chromatographic concentrations were assumed low enough to eliminate addressing $2^{nd}$ Virial coefficient effects (concentration effects on molecular weight).

g' average was calculated for the samples as follow:

1. The light scattering, viscosity, and concentration detectors were calibrated with NBS 1475 homopolymer polyethylene (or equivalent reference);
2. The light scattering and viscometer detector offsets relative to the concentration detector was corrected as described in the calibration section;
3. Baselines were subtracted from the light scattering, viscometer, and concentration chromatograms and set integration windows making certain to integrate all of the low molecular weight retention volume range in the light scattering chromatogram that were observable from the refractometer chromatogram;
4. A linear homopolymer polyethylene Mark-Houwink reference line was established by injecting a standard with a polydispersity of at least 3.0, and the data file (from above calibration method), was calculated and the intrinsic viscosity and molecular weight from the mass constant corrected data for each chromatographic slice was recorded;
5. The HDPE sample of interest was injected and the data file (from above calibration method), was calculated and the intrinsic viscosity and molecular weight from the mass constant corrected data for each chromatographic slice was recorded;
6. The homopolymer linear reference intrinsic viscosity was shifted by the following factor: IV=IV*1/(1+2*SCBf/1,000C*branch point length) where IV is the intrinsic viscosity of the HDPE sample of interest, SCB/1,000C(=SCBf) was determined from C13 NMR, and the branch point length is 2 for butene, 4 for hexene, or 6 for octene;
7. g' average was calculated according to the following equation.

$$g' = \frac{\sum_{j=WhereM>40,000}^{HighestM} \left[c_j \times \left(\frac{IV_j}{IV_{Lj}}\right)_M\right] + \sum_{j=LowestM}^{WhereM>40,000}}{\sum_{j=LowestM}^{HighestM} c_j}$$

Where c is the concentration of the slice, IV is the intrinsic viscosity of the HDPE, and $IV_L$ is the intrinsic viscosity of the linear homopolymer polyethylene reference (corrected for SCB of the HDPE sample of interest) at the same molecular weight (M). The IV ratio was assumed to be one at molecular weights less than 40,000 to account for natural scatter in the light scattering data.

The present invention may be embodied in other forms without departing from the spirit and the essential attributes thereof, and, accordingly, reference should be made to the appended claims, rather than to the foregoing specification, as indicating the scope of the invention.

TABLE I

|  | Example 1 | Example 2 | Example 3 | Example 4 | Example 5 | Example 6 |
| --- | --- | --- | --- | --- | --- | --- |
| Co-Monomer Type | 1-hexene | 1-hexene | 1-hexene | 1-hexene | 1-hexene | 1-hexene |
| Catalyst | Ziegler-Natta | Ziegler-Natta | Ziegler-Natta | Ziegler-Natta | Ziegler-Natta | Ziegler-Natta |
| Co-Catalyst | 2.5% TEAL | 2.5% TEAL | 2.5% TEAL | 2.5% TEAL | 2.5% TEAL | 2.5% TEAL |
| $1^{st}$ Reactor Type | Gas Phase | Gas Phase | Gas Phase | Gas Phase | Gas Phase | Gas Phase |
| $2^{nd}$ Reactor Type | Gas Phase | Gas Phase | Gas Phase | Gas Phase | Gas Phase | Gas Phase |
| $1^{st}$ Reaction Temperature (° C.) | 85 | 85 | 85 | 85 | 85 | 85 |
| $2^{nd}$ Reaction Temperature (° C.) | 109.9 | 110 | 110 | 110 | 110 | 110 |
| $1^{st}$ Reaction Pressure (psi) | 349 | 349 | 349 | 349 | 348 | 348 |
| $2^{nd}$ Reaction Pressure (psi) | 403 | 405 | 405 | 402 | 404 | 394 |
| $1^{st}$ Reactor $C_2$ Partial Pressure (psi) | 23.2 | 22.6 | 26.3 | 24.9 | 20.7 | 26.1 |
| $2^{nd}$ Reactor $C_2$ Partial Pressure (psi) | 93.7 | 97.2 | 100.6 | 100.8 | 104.1 | 81.1 |
| $1^{st}$ Reactor $H_2/C_2$ Molar Ratio | 0.082 | 0.060 | 0.093 | 0.080 | 0.052 | 0.115 |
| $2^{nd}$ Reactor $H_2/C_2$ Molar Ratio | 1.80 | 1.802 | 1.805 | 1.127 | 1.799 | 1.799 |
| $1^{st}$ Reactor $C_6/C_2$ Molar Ratio | 0.062 | 0.1049 | 0.0253 | 0.0635 | 0.0918 | 0.0463 |
| $2^{nd}$ Reactor $C_6/C_2$ Molar Ratio | 0.004 | 0.0051 | 0.0050 | 0.0036 | 0.0021 | 0.0029 |
| Catalyst Feed Rate (cc/hr) (First Reactor Only) | 3.2 | 5.2 | 5.7 | 5.4 | 7.2 | 6 |
| $1_{st}$ Reactor Isopentane (Mole %) | 8.6 | 8.7 | 8.0 | 7.4 | 7.4 | 8.8 |
| $2^{nd}$ Reactor Isopentane (Mole %) | 4.0 | 4.4 | 3.5 | 2.8 | 2.6 | 3.4 |

TABLE II

|  | Example 1 | Example 2 | Example 3 | Example 4 | Example 5 | Example 6 |
| --- | --- | --- | --- | --- | --- | --- |
| Split ($1^{st}$ reactor/$2^{nd}$ reactor) | 0.448/0.552 | 0.472/0.528 | 0.484/0.516 | 0.460/0.540 | 0.427/0.573 | 0.559/0.441 |
| Cocatalyst Feed Rate (cc/hr) ($1^{st}$ reactor/$2^{nd}$ reactor) | 161/161 | 161/158 | 162/154 | 162/154 | 171/170 | 162/134 |
| Production Rate (lb/hr) ($1^{st}$ reactor/$2^{nd}$ reactor) | 24.0/21.3 | 24/21 | 24/21 | 24/23 | 25/27 | 25/17 |
| Bed Weight (lbs) ($1^{st}$ reactor/$2^{nd}$ reactor) | 75.6/135.7 | 76/122 | 75/119 | 75/120 | 76/120 | 78/137 |
| FBD (lb/ft$^3$) ($1^{st}$ reactor/$2^{nd}$ reactor) | 11.1/16.3 | 11.1/16.4 | 11.7/17.4 | 11.3/16.5 | 11.1/17.0 | 11.6/16.4 |
| Bed Volume (ft$^3$) ($1^{st}$ reactor/$2^{nd}$ reactor) | 6.8/8.3 | 6.8/7.4 | 6.4/6.8 | 6.7/7.3 | 6.8/7.1 | 6.8/8.3 |
| Residence Time (hr) ($1^{st}$ reactor/$2^{nd}$ reactor) | 3.1/3.0 | 3.2/2.7 | 3.1/2.6 | 3.1/2.6 | 3.1/2.3 | 3.1/3.3 |
| STY (lb/hr/ft$^3$) ($1^{st}$ reactor/$2^{nd}$ reactor) | 3.5/2.6 | 3.5/2.8 | 3.7/3.1 | 3.6/3.2 | 3.6/3.8 | 3.7/2.0 |
| Melt index ($I_{21}$) ($1^{st}$ Component) (~) (g/10 minutes) | 2.28 | 2.25 | 2.04 | 2.41 | 1.36 | 3.96 |
| Density ($1^{st}$ Component) (~) (g/cm$^3$) | 0.9282 | 0.9221 | 0.9360 | 0.9292 | 0.9227 | 0.9336 |
| Residual Ti (ppm) ($1^{st}$ component/$2^{nd}$ component) | 3.76/1.63 | 3.15/1.61 | 3.66/1.61 | 3.33/1.52 | 3.99/1.56 | 3.66/1.99 |
| Residual Al (ppm) ($1^{st}$ component/$2^{nd}$ component) | 97.5/48.2 | 99.63/58.37 | 101.00/49.25 | 94.30/49.42 | 105.69/48.22 | 102.34/56.70 |
| Al/Ti Molar Residual Ti (ppm) ($1^{st}$ component/$2^{nd}$ component) | 47.4/52.8 | 56/65 | 49/55 | 51/54 | 47/56 | 50/51 |
| Bulk Density (lb/ft$^3$) Residual Ti (ppm) ($1^{st}$ component/$2^{nd}$ component) | 17.8/25.0 | 16.7/24.1 | 20.1/25.6 | 17.6/24.5 | 17.0/24.8 | 18.3/24.8 |
| H-D Polyethylene Composition Melt Index ($I_2$) (2.16 g/10 minutes) | 1.48 | 1.46 | 1.39 | 1.66 | 1.31 | 1.58 |
| H-D Polyethylene Composition Melt Index ($I_5$) (5.0 g/10 minutes) | 5.89 | 5.99 | 4.96 | 6.06 | 5.69 | 5.58 |
| H-D Polyethylene Composition Melt Index ($I_{10}$) (10.0 g/10 minutes) | 26.3 | 23.5 | 20.1 | 20.6 | 23.5 | 19.6 |
| H-D Polyethylene Composition Melt Index ($I_{21.6}$) (21.6 g/10 minutes) | 139.7 | 162.0 | 133.6 | 108.6 | 179.5 | 108.0 |
| H-D Polyethylene Composition Melt Flow Ratio ($MI_{21}/MI_2$) | 94.2 | 111.0 | 96.5 | 65.3 | 137.1 | 68.5 |
| H-D Polyethylene Composition Melt Flow Ratio ($MI_{21}/MI_5$) | 23.7 | 27.0 | 26.9 | 17.9 | 31.5 | 19.3 |
| H-D Polyethylene Composition Melt Flow Ratio ($MI_{10}/MI_2$) | 17.7 | 16.1 | 14.5 | 12.4 | 17.9 | 12.5 |
| H-D Polyethylene Composition Density (g/cm$^3$) ASTM Slow cooled | 0.9548 | 0.9506 | 0.9591 | 0.9548 | 0.9546 | 0.955 |
| C13 NMR Hexene Content (Weight Percent) | 1.5 | 2.9 | 0.9 | 1.3 | 1.8 | 1.4 |
| H-D Polyethylene Composition ($M_n$) | 8,125 | 8,920 | 9,310 | 14,500 | 10,500 | 11,700 |
| H-D Polyethylene Composition ($M_w$) | 124,600 | 133,300 | 135,000 | 136,000 | 130,400 | 133,000 |
| H-D Polyethylene Composition ($M_w/M_n$) | 15.3 | 14.9 | 14.5 | 9.4 | 12.4 | 11.4 |
| g' | 1.007 | — | — | — | — | — |
| Atref HD Fraction (%) | 70.8 | 58.4 | 74.1 | 67.4 | 55.9 | 71 |
| Calculated Atref HD Fraction (%) | 36.8 | 28.9 | 43.3 | 36.7 | 27.7 | 41.3 |
| Atref Purge fraction (%) | 15.2 | 21.4 | 21 | 27.4 | 19.6 | 18.3 |
| Atref SCBD Fraction (%) (27 to 86° C.) | 14 | 20.2 | 4.9 | 5.2 | 24.5 | 10.7 |
| Atref MV average | 58,100 | 53,800 | 63,000 | 63,400 | 49,400 | 56,700 |
| Atref SCBD Mv | 58,100 | 56,600 | 68,600 | 68,400 | 51,100 | 60,400 |
| Atref Purge Mv | 58,050 | 43,600 | 41,800 | 46,700 | 42,750 | 40,200 |
| Viscosity at 10−2 sec−1 Shear Rate (Pa·s) | 11,580 | 13,700 | 12,900 | 11,200 | 17,000 | 11,200 |
| Viscosity at 10+2 sec−1 Shear Rate (Pa·s) | 805 | 834 | 903 | 918 | 828 | 952 |
| Ratio 10−2/10+2 | 14.4 | 16.4 | 14.3 | 12.2 | 20.5 | 11.8 |
| Tan Delta @ 10−2 | 7.6 | 6.98 | 7.61 | 8.1 | 5.67 | 8.51 |
| Tan Delta @ 10+2 | 0.828 | 0.79 | 0.81 | 0.94 | 0.76 | 0.88 |

TABLE II-continued

|  | Example 1 | Example 2 | Example 3 | Example 4 | Example 5 | Example 6 |
|---|---|---|---|---|---|---|
| Rheotens Melt Strength (cN) | 2.5 | 2.5 | 2.5 | 2.5 | 3 | 2.5 |
| Rheotens Melt Strength (velocity mm/s) | 212 | 200 | 210 | 205 | 170-200 | 225 |
| Flexural Modulus (0.5 in/min) (psi) | 218,000 | 187,000 | 243,000 | 217,000 | 221,000 | 236,000 |
| Standard Deviation (+/−) | 7,723 | 9,400 | 15,000 | 10,000 | 13,400 | 10,000 |
| 2% Secant Modulus (psi) | 163,000 | 138,000 | 169,000 | 157,000 | 157,000 | 160,000 |
| Standard Deviation (+/−) | 3,470 | 5,660 | 3,300 | 6,900 | 1,900 | 4,400 |
| 1% Secant Modulus (psi) | 193,500 | 164,000 | 203,000 | 186,400 | 188,000 | 193,000 |
| Standard Deviation (+/−) | 5,246 | 8,570 | 5,700 | 9,550 | 1,500 | 5,250 |
| Tensile Properties (ave thickness, mils) | | | | | | |
| Tensile Strength (psi) | 2,600 | 2,500 | 2,550 | 3,250 | 3,050 | 2,650 |
| Standard Deviation (+/−) | 307 | 160 | 260 | 630 | 440 | 100 |
| Elongation at Break (%) | 510 | 480 | 720 | 720 | 630 | 740 |
| Standard Deviation (+/−) | 227 | 145 | 200 | 225 | | 85 |
| Yield Strength (psi) | 3,535 | 3,048 | 3,750 | 3,500 | 3,600 | 3,600 |
| Standard Deviation (+/−) | 135 | 160 | 150 | 140 | 220 | 105 |
| Elongation at Yield (%) | 3.44 | 3.89 | 3.58 | 3.68 | 3.36 | 3.67 |
| Standard Deviation (+/−) | 0.68 | 0.41 | 0.33 | 0.41 | 0.49 | 0.28 |
| ESCR Test Data | | | | | | |
| 50° C.; 10% Igepal; 75 mil plaque, 12 mil slit (F50 hours) | F50 = 509 | F0 > 1,188 | F50 = 239.9 | F50 = 329.4 | F0 > 1,188 | F50 = 247.1 |
| 50° C.; 100% Igepal; 75 mil plaque, 12 mil slit (F50 hours) | F0 > 2,000 | F0 > 1,188 | F50 = 1,071 | F0 > 1,188 | F0 > 1,188 | F0 > 1,188 |
| Extrudability | Good | — | — | — | — | — |
| Compression Molding Caps at Production Rates | Yes | — | — | — | — | — |
| Part Dimensions | Pass | — | — | — | — | — |
| High Temperature Seal Test | Pass | — | — | — | — | — |
| Removal Torque Test | Pass | — | — | — | — | — |
| Strip Torque Test | Pass | — | — | — | — | — |
| $IV_n$ | 0.364 | — | — | — | — | — |
| $IV_w$ | 1.347 | — | — | — | — | — |
| $IV_z$ | 4.708 | — | — | — | — | — |

TABLE III

|  | Example 1 | Example 2 | Example 3 | Example 4 | Example 5 | Example 6 |
|---|---|---|---|---|---|---|
| Irganox 1076 (ppm) | 0 | 0 | 0 | 0 | 0 | 0 |
| Irganox 1010 (ppm) | 420 | 536 | 465 | 486 | 481 | 412 |
| Irgafos 168 Active (ppm) | 353 | 366 | 393 | 360 | 363 | 268 |
| Irgafos 168 Oxidized (ppm) | 120 | 174 | 114 | 159 | 158 | 195 |
| Irgafos 168 Total (ppm) | 473 | 540 | 507 | 519 | 521 | 463 |

TABLE IV

|  | Comparative A | Comparative B | Comparative C | Comparative D | Comparative E |
|---|---|---|---|---|---|
| Melt Index ($I_2$) (2.16 g/10 minutes) | 1.60 | 2.74 | 1.918 | 1.72 | 2.60 |
| Melt Index ($I_5$) (5.0 g/10 minutes) | 5.65 | 8.07 | 6.838 | 6.65 | 9.28 |
| Melt Index ($I_{10}$) (10.0 g/10 minutes) | 19.5 | 19.9 | 21.3 | 23.8 | 27.6 |
| Melt Index ($I_{21.6}$) (21.6 g/10 minutes) | 114.2 | 69.2 | 91.6 | 124.2 | 120.8 |
| Melt Flow Ratio ($MI_{21}/MI_2$) | 71.5 | 25.3 | 47.8 | 72.1 | 46.4 |
| Melt Flow Ratio ($MI_{21}/MI_5$) | 20.2 | 8.6 | 13.4 | 18.7 | 13.0 |
| Melt Flow Ratio ($MI_{10}/MI_2$) | 12.2 | 7.3 | 11.1 | 13.8 | 10.6 |
| Density (g/cm$^3$) | 0.9547 | 0.9525 | 0.9538 | 0.9518 | 0.9547 |
| C13 NMR Hexene | — | 0.7 | — | — | — |

TABLE IV-continued

| | Comparative A | Comparative B | Comparative C | Comparative D | Comparative E |
|---|---|---|---|---|---|
| Content (Weight Percent) | | | | | |
| C13 NMR Butene Content (Weight Percent) | 1.1 | — | 0.7 | 1.4 | 1.2 |
| $M_n$ | 7,140 | 23,240 | 17,000 | 9,900 | 15,200 |
| $M_w$ | 110,610 | 84,300 | 136,200 | 106,000 | 11,1500 |
| $M_w/M_n$ | 15.5 | 3.6 | 8.0 | 10.7 | 7.3 |
| g' | 0.951 | 0.975 | 0.841 | 0.961 | 0.88 |
| Atref HD Fraction (%) | 77.2 | 82.1 | 79.7 | 67.9 | 85.4 |
| Atref Purge fraction (%) | 6.6 | 12.2 | 12.7 | 9.2 | 4.3 |
| Atref SCBD fraction (%) (27 to 86° C.) | 16.2 | 5.7 | 7.6 | 22.9 | 10.3 |
| Atref MV average | 57700 | 61560 | 64100 | 55700 | 53100 |
| Atref SCBD Mv | 58,700 | 62,600 | 65,500 | 54,700 | 53,300 |
| Atref Purge Mv | 43,000 | 54,300 | 54,300 | 64,800 | 47,300 |
| Viscosity at 10−2 sec−1 Shear Rate (Pa·s) | 11,580 | 13,700 | 12,900 | 11,200 | 17,000 |
| Viscosity at 10+2 sec−1 Shear Rate (Pa·s) | 805 | 834 | 903 | 918 | 828 |
| Ratio 10−2/10+2 | 14.4 | 16.4 | 14.3 | 12.2 | 20.5 |
| Tan Delta @ 10−2 | 7.6 | 6.98 | 7.61 | 8.1 | 5.67 |
| Tan Delta @ 10+2 | 0.828 | 0.79 | 0.81 | 0.94 | 0.76 |
| Rheotens Melt Strength (cN) | 2.3 | 1.6 | 3 | 2.3 | — |
| Rheotens Melt Strength (velocity mm/s) | 245 | 345 | 165 | 153 | — |
| Flexural Modulus (0.5 in/min) (psi) | 212,700 | 226,600 | 215,900 | 194,500 | 196,900 |
| Standard Deviation (+/−) | 7260 | 9500 | 13400 | 5840 | 14300 |
| 2% Secant Modulus (psi) | 158,000 | 159,800 | 158,500 | 150,000 | 150,000 |
| Standard Deviation (+/−) | 2,200 | 3,920 | 5,080 | 4,200 | 1,650 |
| 1% Secant Modulus (psi) | 188,500 | 192,500 | 188,500 | 176,000 | 177,800 |
| Standard Deviation (+/−) | 2,470 | 6,000 | 4,280 | 4,200 | 3,700 |
| Tensile Properties (ave thickness, mils) | | | | | |
| Tensile Strength (psi) | 2,380 | 3,525 | 2,730 | 2,590 | 2,450 |
| Standard Deviation (+/−) | 121 | 770 | 110 | 265 | 60 |
| Elongation at Break (%) | 490 | 1,000 | 950 | 840 | 950 |
| Standard Deviation (+/−) | 200 | 110 | 22 | 18 | 20 |
| Yield Strength (psi) | 3,410 | 3,550 | 3,590 | 3,243 | 3,350 |
| Standard Deviation (+/−) | 140 | 40 | 65 | 220 | 155 |
| Elongation at Yield (%) | 4.21 | 3.8 | 4 | 3.9 | 4.1 |
| Standard Deviation (+/−) | 0.53 | 0.2 | 0.28 | 0.3 | 0.27 |
| ESCR Test Data | | | | | |
| 50 C. 10% Igepal 75 mil plaque, 12 mil slit (F50 hours) | F50 = 394.1 | F50 = 67.8 | F50 = 36.3 | F50 = 109.2 | F50 = 42.4 |
| 50 C. 100% Igepal 75 mil plaque, 12 mil slit (F50 hours) | F0 = 1,007; F50 = ~2,560 | F50 = 63.5 | F50 = 24.8 | F50 = 836.8 | F50 = 29.4 |

TABLE IV-continued

|  | Comparative A | Comparative B | Comparative C | Comparative D | Comparative E |
|---|---|---|---|---|---|
| $IV_n$ | 0.358 | 0.72 | 0.585 | 0.412 | 0.557 |
| IVw | 1.475 | 1.523 | 1.386 | 1.473 | 1.403 |
| IVz | 3.557 | 2.912 | 2.517 | 3.708 | 2.607 |

We claim:

1. A method of producing a high-density polyethylene composition comprising the steps of:
    introducing ethylene, and an alpha-olefin comonomer into a first reactor;
        polymerizing said ethylene in the presence of said alpha-olefin comonomer in said first reactor thereby producing a first component, wherein said first component being a high molecular weight ethylene alpha-olefin copolymer having a density in the range of 0.915 to 0.940 g/cm$^3$, and a melt index ($I_{21}$) in the range of 0.5 to 10 g/10 minutes;
    introducing said first component and additional ethylene into a second reactor;
        polymerizing said additional ethylene in said second reactor thereby producing a second component, wherein said second component being a low molecular weight ethylene polymer having a density in the range of 0.965 to 0.980 g/cm$^3$, and a melt index ($I_2$) in the range of 50 to 1500 g/10 minutes; and
        thereby producing said high-density polyethylene composition, wherein high-density polyethylene composition having a melt index ($I_2$) of at least 1 g/10 minutes, a density in the range of 0.950 to 0.960 g/cm$^3$, and g' of equal or greater than 1.

2. The method of producing a high-density polyethylene composition according to claim 1, wherein said first component having a density in the range of 0.920 to 0.940 g/cm$^3$.

3. The method of producing a high-density polyethylene composition according to claim 1, wherein said first component having a density in the range of 0.921 to 0.936 g/cm$^3$.

4. The method of producing a high-density polyethylene composition according to claim 1, wherein said first component having a melt index ($I_{21.6}$) in the range of 1 to 7 g/10 minutes.

5. The method of producing a high-density polyethylene composition according to claim 1, wherein said first component having a melt index ($I_{21.6}$) in the range of 1.3 to 5 g/10 minutes.

6. The method of producing a high-density polyethylene composition according to claim 1, wherein said second component having a density in the range of 0.970 to 0.975 g/cm$^3$.

7. The method of producing a high-density polyethylene composition according to claim 1, wherein said second component having a melt index ($I_2$) in the range of 100 to 1500 g/10 minutes.

8. The method of producing a high-density polyethylene composition according to claim 1, wherein said second component having a melt index ($I_2$) in the range of 200 to 1500 g/10 minutes.

9. The method of producing a high-density polyethylene composition according to claim 1, wherein said high-density polyethylene composition having a melt index ($I_2$) in the range of 1 to 2 g/10 minutes.

10. The method of producing a high-density polyethylene composition according to claim 1, wherein said high-density polyethylene composition having a melt index ($I_2$) of at least 2 g/10 minutes.

11. The method of producing a high-density polyethylene composition according to claim 1, wherein said first component having a molecular weight in the range of 150,000 to 375,000.

12. The method of producing a high-density polyethylene composition according to claim 1, wherein said second component having a molecular weight in the range of 12,000 to 40,000.

13. The method of producing a high-density polyethylene composition according to claim 1, wherein said first component having a density in the range of 0.921 to 0.936 g/cm$^3$, and a melt index ($I_{21.6}$) in the range of 1.3 to 5 g/10 minutes; wherein said second component having a density in the range of 0.970 to 0.975 g/cm$^3$, and a melt index ($I_2$) in the range of 200 to 1500 g/10 minutes.

14. The method of producing a high-density polyethylene composition according to claim 1, wherein said first component being substantially free of any long chain branching, and said second component being substantially free of any long chain branching.

15. The method of producing a high-density polyethylene composition according to claim 14, wherein said high-density polyethylene composition being substantially free of any long chain branching.

16. The method of producing a high-density polyethylene composition according to claim 1, wherein said high-density polyethylene composition having a single ATREF temperature peak, wherein said ATREF temperature peak having a temperature peak maximum between 90° C. to 105° C.;
    wherein said high-density polyethylene composition having a calculated high density fraction in the range of 20 percent to 50 percent, said calculated high density fraction being defined as [(2)*(the weight ratio of the high-density polyethylene that elutes in ATREF-DV at temperatures greater than or equal to said temperature peak maximum)],
    wherein said high-density polyethylene composition having a relative minimum in the log of the relative viscosity average molecular weight at about 90° C. in ATRF-DV;
    wherein said high-density polyethylene composition having a regression slope of the log of the relative viscosity average molecular weight versus the ATREF-DV viscosity versus temperature plot of less than about 0, said elution temperature measured between 70° C. to 90° C.

17. The method of producing a high-density polyethylene composition according to claim 1, wherein said high-density polyethylene composition having a comonomer content in weight percent of equal or greater that [(−228.41*density of said high-density polyethylene composition)+219.36)]*[1 (weight percent)/(g/cm$^3$)], wherein the density being measured in g/cm$^3$.

18. The method of producing a high-density polyethylene composition according to claim 1, wherein said high-density polyethylene composition having an ATREF high-density fraction in percent of equal or less than [(2750*density of the high-density polyethylene composition)−2552.2]*[1(percent)/(g/cm$^3$)], where the density being measured in g/cm$^3$.

* * * * *